United States Patent [19]

Hoy et al.

[11] Patent Number: 5,057,342

[45] Date of Patent: * Oct. 15, 1991

[54] METHODS AND APPARATUS FOR OBTAINING A FEATHERED SPRAY WHEN SPRAYING LIQUIDS BY AIRLESS TECHNIQUES

[75] Inventors: Kenneth L. Hoy, Saint Albans; Kenneth A. Nielsen, Charleston, both of W. Va.; Hendrik F. Bok, Fairhaven, Mass.

[73] Assignee: Union Carbide Chemicals and Plastics Technology Corporation, Danbury, Conn.

[ * ] Notice: The portion of the term of this patent subsequent to May 23, 2008 has been disclaimed.

[21] Appl. No.: 327,273

[22] Filed: Mar. 22, 1989

Related U.S. Application Data

[63] Continuation-in-part of Ser. No. 133,068, Dec. 21, 1987, abandoned, which is a continuation-in-part of Ser. No. 833,156, Jul. 8, 1986, abandoned.

[51] Int. Cl.$^5$ .............................................. B05D 1/02
[52] U.S. Cl. .................................. 427/422; 427/385.5
[58] Field of Search .................. 118/300, 302; 427/27, 427/421, 422, 426, 384, 385.5; 239/9, 10, 299, 128, 597, 599, 432, 343, DIG. 1

[56] References Cited

U.S. PATENT DOCUMENTS

| | | | |
|---|---|---|---|
| 4,124,528 | 11/1978 | Modell | 252/411 R |
| 4,189,914 | 2/1980 | Marek et al. | 60/726 |
| 4,375,387 | 3/1983 | deFilippi et al. | 202/169 |
| 4,582,731 | 4/1986 | Smith | 427/421 |
| 4,619,735 | 10/1986 | Norton | 162/135 |
| 4,734,227 | 3/1986 | Smith | 264/13 |
| 4,734,451 | 3/1986 | Smith | 118/300 X |
| 4,737,384 | 4/1988 | Murthy et al. | 427/369 |

FOREIGN PATENT DOCUMENTS

| | | |
|---|---|---|
| 2603664 | 8/1977 | Fed. Rep. of Germany . |
| 2853066 | 6/1980 | Fed. Rep. of Germany . |
| 55-84328 | 6/1980 | Japan . |
| 58-168674 | 10/1983 | Japan . |
| 59-16703 | 1/1984 | Japan . |
| 62-152505 | 7/1987 | Japan . |
| 868051 | 4/1988 | South Africa . |

OTHER PUBLICATIONS

Cobbs et al., "High Solids Coatings Above 80% by Volume", pp. 175-192, presented at Water—Borne and Higher Solids Coatings Symposium, Mar. 10-12, 1980.
Francis, A. W., "Ternary Systems of Liquid Carbon Dioxide", J. Phys. Chem. 58:1099, Dec. 1954.
Smith, R. D. et al., "Direct Fluid Injection Interface for Capillary Supercritical Fluid Chromatography—Mass Spectrometry", J. Chromatog. 247(1982):231-243.
Krukonis, V., "Supercritical Fluid Nucleation of Difficult—to—Comminute Solids", paper presented at 1984 Annual Meeting, AIChE, San Francisco, Calif., 11/25-30/84.
Dandage, D. K. et al., "Structure Solubility Correlations: Organic Compounds and Dense Carbon Dioxide Binary Systems", Ind. Eng. Chem. Prod. Res. Dev. 24: 162-166 (1985).
Matson, D. W. et al., "Production of Powders and Films by the Rapid Expansion of Supercritical Solutions", J. Materials Science 22: 1919-1928 (1987).
McHugh, M. A. et al., "Supercritical Fluid Extraction, Principles and Practice", Butterworth Publishers (1986), Contents and Appendix.
Matson, D. W. et al., "Production of Fine Powders by the Rapid Expansion of Supercritical Fluid Solutions", Advances in Ceramics, vol. 21, pp. 109-121 (1987).
Kitamura, Y. et al., "Critical Superheat for Flashing of Superheated Liquid Jets", Ind. Eng. Chem. Fund. 25:206-211 (1986).
Petersen, R. C. et al., "The Formation of Polymer Fibers From the Rapid Expansion of SCF Solutions", Pol. Eng. & Sci. (1987), vol. 27, p. 1693.

*Primary Examiner*—Shrive P. Beck
*Assistant Examiner*—Alain Bashore
*Attorney, Agent, or Firm*—Morris N. Reinisch

[57] ABSTRACT

The present invention is directed to methods and apparatus for spraying liquid compositions by airless spray techniques which avoid fishtail spray patterns and desirably obtain feathered spray patterns.

34 Claims, 23 Drawing Sheets

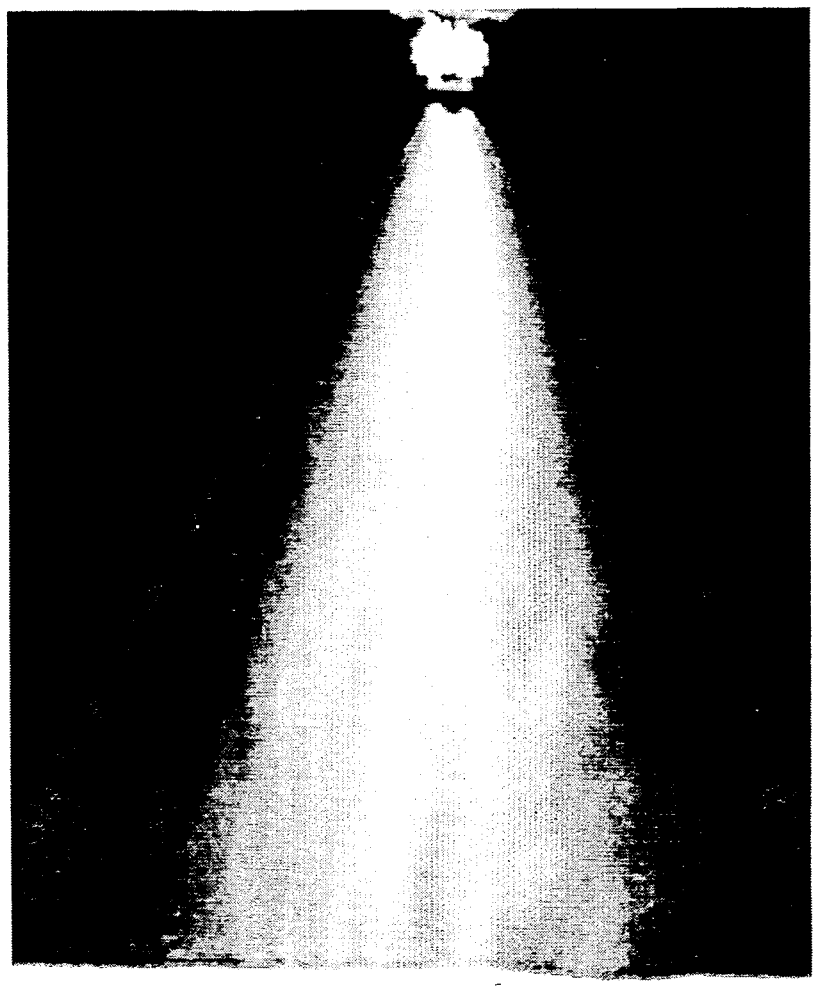
FIG. 4c

DISTANCE ALONG COATING DEPOSITED BY SPRAY FAN

DISTANCE ALONG COATING DEPOSITED BY SPRAY FAN

DISTANCE ALONG COATING DEPOSITED BY SPRAY FAN

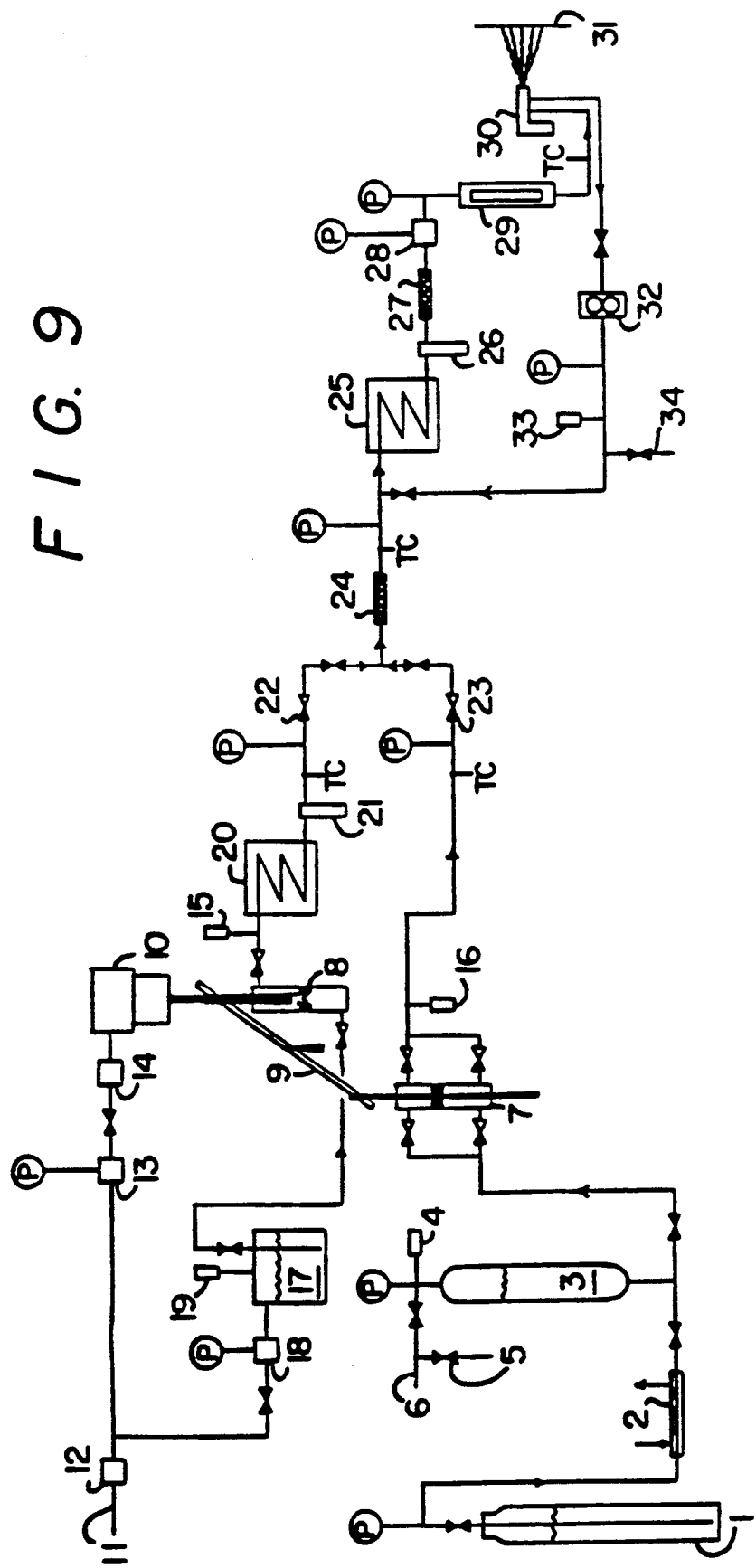

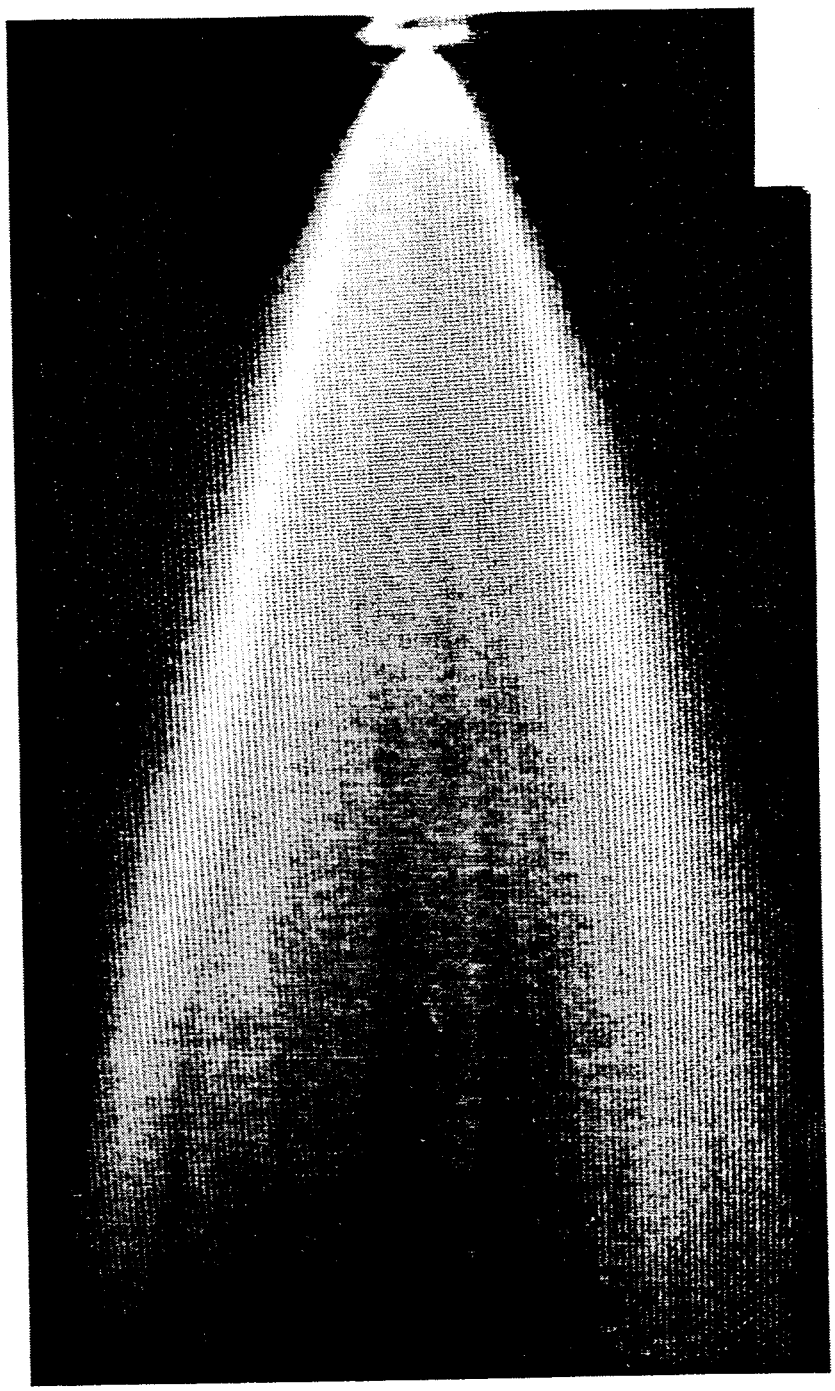
FIG. IIa

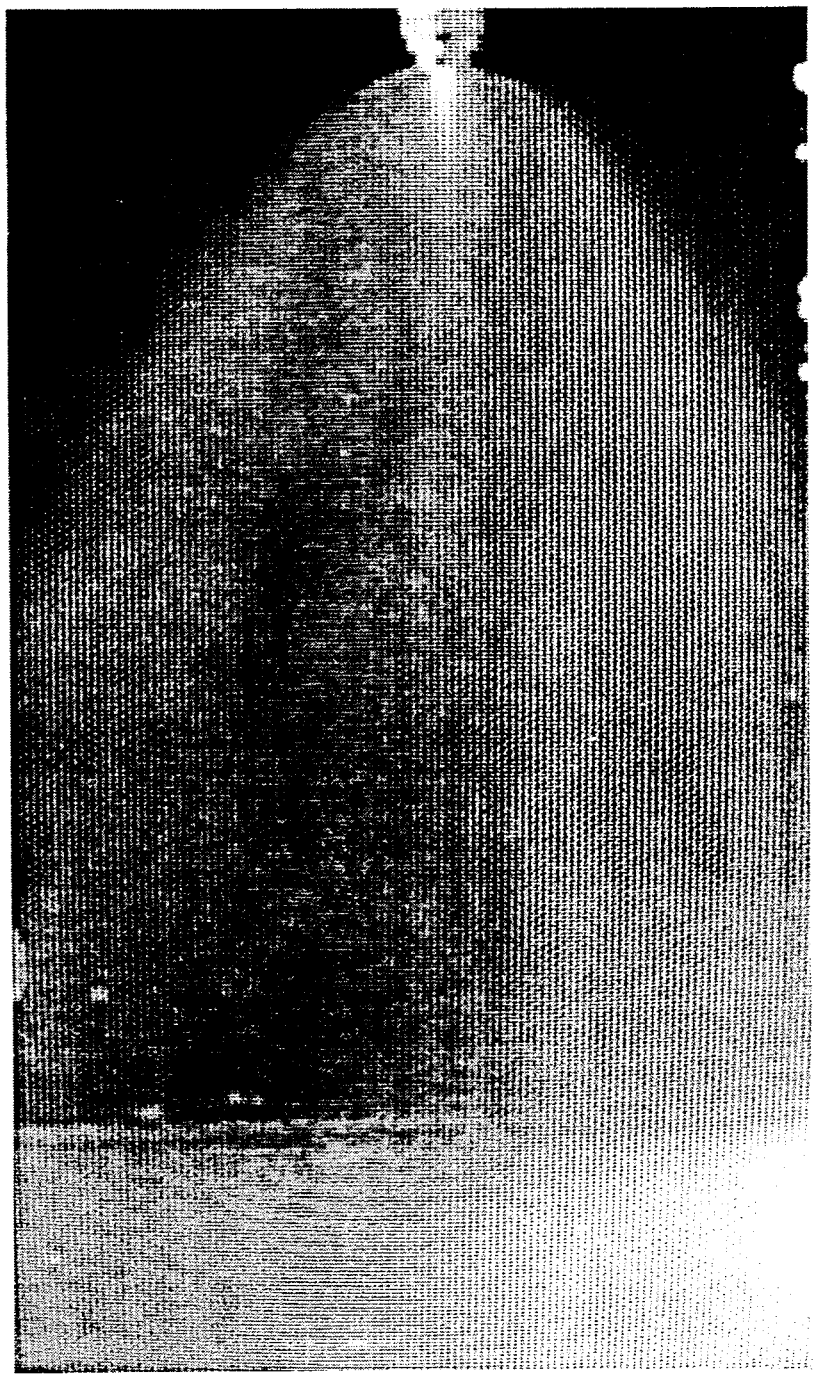
FIG. IIb

METHODS AND APPARATUS FOR OBTAINING A FEATHERED SPRAY WHEN SPRAYING LIQUIDS BY AIRLESS TECHNIQUES

RELATED PATENT APPLICATIONS

This application is a continuation-in-part of application Ser. No. 133,068, filed Dec. 21, 1987, now abandoned the contents of which are incorporated herein by reference as if set forth in full, which in turn is a continuation-in-part of application Ser. No. 833,156, filed July 8, 1986, now abandoned. This application also contains subject matter related to U.S. Pat. Ser. No. 218,896, filed July 14, 1988, now abandoned; and Ser. No. 218,910, filed July 14, 1988.

FIELD OF THE INVENTION

This invention, in general, pertains to the field of spraying liquid compositions. More particularly, the present invention is directed to methods and apparatus for spraying liquid compositions so as to avoid fishtail spray patterns and desirably obtain feathered spray patterns in airless spraying techniques.

BACKGROUND OF THE INVENTION

Coating formulations are commonly applied to a substrate by passing the coating formulation under pressure through an orifice into air in order to form a liquid spray, which impacts the substrate and forms a liquid coating. In the coatings industry, three types of orifice sprays are commonly used; namely, air spray, airless spray, and air assisted airless spray.

Air spray uses compressed air to break up the liquid coating formulation into droplets and to propel the droplets to the substrate. The most common type of air nozzle mixes the coating formulation and high-velocity air outside of the nozzle to cause atomization. Auxiliary air streams are used to modify the shape of the spray. The coating formulation flows through the liquid orifice in the spray nozzle with relatively little pressure drop. Siphon or pressure feed, usually at pressures less than 18 psi, are used, depending upon the viscosity and quantity of coating formulation to be sprayed.

Airless spray uses a high pressure drop across the orifice to propel the coating formulation through the orifice at high velocity. Upon exiting the orifice, the high-velocity liquid breaks up into droplets and disperses into the air to form a liquid spray. Sufficient momentum remains after atomization to carry the droplets to the substrate. The spray tip is contoured to modify the shape of the liquid spray, which is usually a round or elliptical cone or a flat fan. Turbulence promoters are sometimes inserted into the spray nozzle to aid atomization. Spray pressures typically range from 700 to 5000 psi. The pressure required increases with fluid viscosity.

Air-assisted airless spray: combines features of air spray and airless spray. It uses both compressed air and high pressure drop across the orifice to atomize the coating formulation and to shape the liquid spray, typically under milder conditions than each type of atomization is generated by itself. Generally the compressed air pressure and the air flow rate are lower than for air spray. Generally the liquid pressure drop is lower than for airless spray, but higher than for air spray. Liquid spray pressures typically range from 200 to 800 psi. The pressure required increases with fluid viscosity.

Air spray, airless spray, and air-assisted airless spray can also be used with the liquid coating formulation heated or with the air heated or with both heated. Heating reduces the viscosity of the liquid coating formulation and aids atomization.

A problem generally associated with airless spray techniques is their apparent inability to atomize the coating material in a manner so as to provide a desirable "feathered" pattern having a relatively wide central portion within which the distribution of coating material particles is reasonably uniform, and opposite extremities or margins thereof having a progressively decreasing number of particles per-unit of width. This is one of the principle reasons why, instead of using airless sprays, air sprays are used so as to provide coatings having high quality finishes. Air spray techniques, unlike spray techniques, are capable of producing a uniform amount of coating material particles at the center of the spray. This is particularly desirable so as to enable adjacent layers of the sprayed coating to be overlapped thereby providing a coating of uniform thickness.

The air spray technique is able to accomplish the production of a feathered spray pattern by using a large amount of compressed air to atomize the liquid coating formulation.

In contrast, airless spray techniques use no compressed air. Instead, the liquid coating formulation is sprayed at high pressure through an orifice into the environment in which the substrate to be coated is present, generally air. But airless spray guns characteristically give a fishtail spray pattern instead of a feathered spray pattern. Such fishtail spray patterns contain more coating material particles at the extremities or margins of the spray instead of in the center. Consequently, it is difficult to properly blend together adjacent layers of coating which have been deposited by means of such a fishtail spray pattern in a manner which provides a suitable uniform film of coating material upon a coated substrate.

However, it is well known that airless spray techniques deposit more of the coating formulation onto the substrate, i.e., it has a higher transfer efficiency, than that characterized by air spray techniques. As a result, while it is desirable to utilize airless spray techniques to obtain such higher transfer efficiencies, it is nevertheless hindered by the fact that it is known that the spray pattern that will be produced is one which does not provide a desirable feathered spray.

Accordingly, attempts have been made to obtain a desirable feathered spray pattern from airless spray techniques. Generally, such attempts have been focused upon mechanical solutions, namely, providing variations in the construction of the airless spray nozzles, providing turbulence promotion devices in the spray guns, combinations of these modifications, and the like. U.S. Pat. Nos. 3,659,787, 3,754,710, and 4,346,849 illustrate various embodiments in which the nozzle tip is constructed and modified so as to help provide a feathered spray. So too, in U.S. Pat. No. 3,556,411, a turbulence promoting device is described which is also included to help eliminate fishtailing in an airless spray technique.

While such mechanical improvements to the spray nozzle and/or spray gun may help improve the problem with fishtail patterns, they nevertheless suffer from the disadvantages of generally still not being able to provide a full, feathered spray pattern which is substantially equivalent to that obtained with air spraying. So too, they manifestly require the necessity of replacing and/or using specially constructed nozzle tips and/or spray guns in order to accomplish these objectives.

Clearly, what is needed is a means for providing a feathered spray pattern using an airless spray technique which feathered spray pattern is essentially equivalent of that obtained when using an air spraying technique. Moreover, such method should be capable of providing such a desirable feathered spray while using conventional airless spray guns and nozzles without the need to modify them in any manner.

SUMMARY OF THE INVENTION

By virtue of the present invention, methods and apparatus have been discovered which are indeed able to accomplish the above noted objectives. Thus, the methods of the present invention are able to produce a feathered spray pattern using an airless spray technique without, however, having to modify the mechanical and/or structural characteristics of the nozzle, nozzle tip, spray gun, or the like, as has been necessary in the prior art.

More particularly, the method of the present invention involves a totally new approach to the spraying of liquid mixtures, such as coating formulations, which involves spraying the coating formulation in conjunction with at least one supercritical fluid. By spraying coating formulations which contain supercritical fluid, a feathered airless spray having the spray characteristics similar to an air spray technique but the high transfer efficiency characteristics of an airless spray is obtained. Consequently, the best features of air spray and airless spray are desirably realized by the present invention. Significantly, these benefits are obtained without resorting to any mechanical or structural changes in either the spray nozzles or spray gun. Conventional airless spraying equipment may be utilized.

As used herein, it will be understood that the phrase "coating formulation" is meant to include typical, conventional coating compositions which do not have any supercritical fluid admixed therewith. Also as used herein, the phrases "liquid mixture" or "admixed liquid mixture" are meant to include an admixture of a coating formulation with at least one supercritical fluid.

Accordingly, in one aspect, the present invention is directed to a method of spraying a liquid mixture to obtain a feathered spray which comprises:
(a) forming a liquid mixture in a closed system, said liquid mixture comprising:
  (i) a solids fraction containing at least one component capable of forming a coating on a substrate;
  (ii) a solvent fraction which is at least partially miscible with the solids fraction; and
  (iii) at least one supercritical fluid in at least an amount which when added to (i) and (ii) is sufficient to form a feathered spray pattern when sprayed; and
(b) spraying said liquid mixture by passing it under pressure through an orifice.

In an alternative embodiment, the present invention is also directed to a method of decreasing fishtail in a sprayed liquid coating composition which is capable of forming a coating on a substrate which comprises admixing at least one supercritical fluid with the liquid coating composition prior to spraying the resulting liquid mixture under Pressure through an orifice in at least an amount sufficient to decrease the fishtail.

The preferred supercritical fluid that is used in the present invention is supercritical carbon dioxide.

The apparatus of the invention comprises an apparatus in which the mixture of coating formulation and supercritical fluid is blended and sprayed. Said apparatus is comprised, in combination, of:
(a) means for supplying a solids fraction containing at least one component capable of forming a coating on a substrate;
(b) means for supplying a solvent fraction which is at least partially miscible with the solids fraction;
(c) means for supplying at least one supercritical fluid;
(d) means for forming a liquid mixture of components supplied from (a)–(c); and
(e) means for spraying said liquid mixture by passing the mixture under pressure through an orifice to form a feathered liquid spray.

The apparatus further comprises (f) means for heating of any said components and/or said liquid mixture of components.

The use of supercritical fluids as a transport medium for the manufacture of surface coatings is well known. German patent application 28 53 066 describes the use of a gas in the supercritical state as the fluid medium containing the solid or liquid coating substance in the dissolved form. In particular, the application addresses the coating of porous bodies with a protectant or a reactive or nonreactive decorative finish by immersion of the porous body in the supercritical fluid coupled with a pressure drop to effect the coating. The most significant porous bodies are porous catalysts. However, the applicant characterizes fabrics as porous bodies.

Smith, U.S. Pat. No. 4,582,731, patented Apr. 15, 1986, and U.S. Pat. No. 4,734,451, patented Mar. 29, 1988, describe forming a supercritical solution which includes a supercritical fluid solvent and a dissolved solute of a solid material and spraying the solution to produce a "molecular spray." A "molecular spray" is defined as a spray "of individual molecules (atoms) or very small clusters of the solute." The Smith patents are directed to producing fine films and powders. The films are used as surface coatings.

The ability to combine a supercritical fluid with a liquid coating formulation to produce an effective and useable spray at all, much less, a desirable feathered spray pattern which advantageously combines the best benefits of both air and airless spray, is quite surprising.

Indeed, prior to the present invention and the inventions described in the above-noted related applications, it was unknown how a high concentration of highly volatile supercritical fluid, such as supercritical carbon dioxide fluid, would affect formation of a liquid spray containing a solids fraction; a solvent fraction in which said solids fraction is dissolved, suspended or dispersed; and a portion of the supercritical fluid. A spray mixture undergoes a large and rapid drop in pressure as it goes through the orifice. Accordingly, one of ordinary skill in the art could theorize that the supercritical spray mixture would produce a foam like shaving cream instead of a spray, because nucleation to form gas bubbles would be so rapid and intense. Alternatively, one of ordinary skill in the art could also expect that the spray mixture would produce a mist or fog of microdroplets instead of a spray, because atomization would be so intense. Another result that one could theorize is that the spray mixture would produce a spray of bubbles instead of droplets. Furthermore, even if a spray were formed, one of ordinary skill in the art could expect that the sudden and intense cooling that accompanies rapid depressurization and expansion of a supercritical fluid would cause the liquid droplets to freeze solid. For example, it is commonly known that the spray from carbon dioxide fire extinguishers produces solid dry ice particles.

In the event that formation of a liquid spray were achieved, there is no assurance that the spray could be used to produce quality coatings on a substrate. One of ordinary skill in the art could surmise that the liquid droplets would be so small or have so little momentum that they could not be deposited well onto the substrate. One could also theorize that foaming droplets or supercritical fluid dissolved in the coating would produce a layer of foam on the substrate or a coating full of bubbles when these characteristics were not desired in the coating. The liquid coating droplets that are deposited onto the substrate would have a much higher viscosity than the material that was sprayed, because they would have lost most of the supercritical fluid diluent and they would be at a lower temperature. One of ordinary skill in the art could also expect that moisture would condense onto the droplets and harm the coating, because the spray would be cooled below the dew point.

Surprisingly, however, liquid sprays having a feathered spray pattern using airless spray equipment can indeed be formed by using supercritical fluids and such sprays can be used to deposit quality coatings onto substrates.

BRIEF DESCRIPTION OF THE DRAWINGS

FIGS. 4a, 4b, 4c, and 4d are photo reproductions of actual atomized liquid sprays containing a fishtail spray pattern which is not in accordance with the present invention.

FIG. 9 is a schematic diagram of yet another spray apparatus that can be used with the liquid mixture of coating formulation and supercritical fluid.

FIGS. 10 are photo reproductions of actual atomized liquid sprays for a cellulose acetate butyrate coating formulation.

FIGS. 11 are photo reproductions of actual atomized liquid sprays for an acrylic lacquer coating formulation. FIG. 11a shows the fishtail spray pattern obtained by airless spraying with insufficient supercritical carbon dioxide and spray temperature to obtain a feathered spray pattern and which is not in accordance with the present invention. FIG. 11b shows the feathered spray pattern obtained by airless spraying with sufficient supercritical carbon dioxide and spray temperature in accordance with the present invention.

FIGS. 12 are photo reproductions of actual atomized liquid sprays for an acrylic thermosetting coating formulation showing the transition from a fishtail spray pattern at low supercritical carbon dioxide content to a feathered spray pattern at high supercritical carbon dioxide content. FIGS. 12a, 12b, 12c, and 12d are for admixed liquid mixtures that contain 14%, 19.7%, 22%, and 25% supercritical carbon dioxide, respectively.

DETAILED DESCRIPTION OF THE INVENTION

Figure 1:
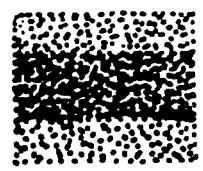
FIG. 1 is a diagrammatic illustration of a feathered spray pattern coating layer obtained on a substrate by means of the process of the present invention.

Because of its importance to the claimed invention, a brief discussion of relevant supercritical fluid phenomena is warranted.

Super critical fluid phenomenon is well documented, see pages F-62 - F-64 of the CRC Handbook of Chemistry and Physics, 67th Edition, 1986–1987, published by the CRC Press, Inc., Boca Raton, Fla. At high pressures above the critical point, the resulting supercritical fluid, or "dense gas", will attain densities approaching those of a liquid and will assume some of the properties of a liquid. These properties are dependent upon the fluid composition, temperature, and pressure. As used herein, the "critical point" in the transition point at which the liquid and gaseous states of a substance merge into each other and represents the combination of the critical temperature and critical pressure for a given substance. The "critical temperature", as used herein, is defined as the temperature above which a gas cannot be liquefied by an increase in pressure. The "critical pressure", as used herein, is defined as that pressure which is just sufficient to cause the appearance of two phases at the critical temperature.

The compressibility of supercritical fluids is great just above the critical temperature where small changes in pressure result in large changes in the density of the supercritical fluid. The "liquid-like" behavior of a supercritical fluid at higher pressures results in greatly enhanced solubilizing capabilities compared to those of the "subcritical" compound, with higher diffusion coefficients and an extended useful temperature range compared to liquids. Compounds of high molecular weight can often be dissolved in the supercritical fluid at relatively low temperatures. An interesting phenomenon associated with supercritical fluids is the occurrence of a "threshold pressure" for solubility of a high molecular weight solute. As the pressure is increased, the solubility of the solute will often increase by many orders of magnitude with only a small pressure increase. The solvent capabilities of the supercritical fluid, however, are not essential to the broad aspects of the invention.

Near-supercritical liquids also demonstrate solubility characteristics and other pertinent properties similar to those of supercritical fluids. The solute may be a liquid at the supercritical temperatures, even though it is a solid at lower temperatures. In addition, it has been demonstrated that fluid "modifiers" can often alter supercritical fluid properties significantly, even in relatively low concentrations, greatly increasing solubility for some solutes. These variations are considered to be within the concept of a supercritical fluid as used in the context of this invention. Therefore, as used herein, the phrase "supercritical fluid" denotes a compound above, at, or slightly below the critical temperature and pressure (the critical point) of that compound.

Examples of compounds which are known to have utility as supercritical fluids are given in Table 1.

TABLE 1

EXAMPLES OF SUPERCRITICAL SOLVENTS

| Compound | Boiling Point (°C.) | Critical Temperature (°C.) | Critical Pressure (atm) | Critical Density (g/cm$^3$) |
| --- | --- | --- | --- | --- |
| $CO_2$ | −78.5 | 31.3 | 72.9 | 0.448 |
| $NH_3$ | −33.35 | 132.4 | 112.5 | 0.235 |
| $H_2O$ | 100.00 | 374.15 | 218.3 | 0.315 |
| $N_2O$ | −88.56 | 36.5 | 71.7 | 0.45 |
| Xenon | −108.3 | 16.6 | 57.6 | 0.118 |
| Krypton | −153.2 | −63.8 | 54.3 | 0.091 |
| Methane | −164.00 | −82.1 | 45.8 | 0.2 |
| Ethane | −88.63 | 32.28 | 48.1 | 0.203 |
| Ethylene | −103.7 | 9.21 | 49.7 | 0.218 |
| Propane | −42.1 | 96.67 | 41.9 | 0.217 |
| Pentane | 36.1 | 196.6 | 33.3 | 0.232 |
| Methanol | 64.7 | 240.5 | 78.9 | 0.272 |
| Ethanol | 78.5 | 243.0 | 63.0 | 0.276 |
| Isopropanol | 82.5 | 235.3 | 47.0 | 0.273 |
| Isobutanol | 108.0 | 275.0 | 42.4 | 0.272 |
| Chlorotrifluoromethane | −31.2 | 28.0 | 38.7 | 0.579 |
| Monofluoromethane | −78.4 | 44.6 | 58.0 | 0.3 |
| Cyclohexanol | 155.65 | 356.0 | 38.0 | 0.273 |

Due to the low cost, environmental acceptability, non-flammability and low critical temperature of carbon dioxide, supercritical carbon dioxide fluid is preferably used with the coating formulations. For many of the same reasons, nitrous oxide ($N_2O$) is a desirable supercritical fluid for admixture with the coating formulations. However, any of the aforementioned supercritical fluids and mixtures thereof are to be considered as being applicable for use with the coating formulations.

The solvency of supercritical carbon dioxide is substantially similar to that of a lower aliphatic hydrocarbon and, as a result, one can consider supercritical carbon dioxide as a replacement for the hydrocarbon solvent of a conventional coating formulation. In addition to the environmental benefit of replacing hydrocarbon solvents with supercritical carbon dioxide, there is a safety benefit also, because carbon dioxide is non-flammable.

Due to the solvency of the supercritical fluid with the coating formulations, a single phase liquid mixture is able to be formed which is not only capable of being sprayed by airless spray techniques but which forms the desired feathered spray pattern.

The present invention is not narrowly critical to the type of coating formulation that can be sprayed provided that there is less than about 30% by weight, preferably less than about 20% by weight of water in the diluent fraction (as herein later defined) of the formulation. Thus, essentially any coating formulation meeting the aforementioned water limit requirement which is conventionally sprayed with an airless spray technique may also be sprayed by means of the methods and apparatus of the present invention. Such coating formulations are typically used for painting and finishing operations or for applying various adhesives compositions, and the like. Such coating formulations may also include those that are typically utilized in the agricultural field in which fertilizers, weed killing agents, and the like are dispensed.

Generally, such coating formulations typically include a solids fraction containing at least one component which is capable of forming a coating on a substrate, whether such component is an adhesive, a paint, lacquer, varnish, chemical agent, lubricant, protective oil, non-aqueous detergent, or the like. Typically, at least one component is a polymer component which is well known to those skilled in the coatings art.

Generally, the materials used in the solids fraction of the present invention, such as the polymers, must be able to withstand the temperatures and/or pressures which are involved when they are ultimately admixed with the at least one supercritical fluid. Such applicable polymers include thermoplastic or thermosetting materials or may be crosslinkable film forming systems.

In particular, the polymeric components include vinyl, acrylic, styrenic, and interpolymers of the base vinyl, acrylic, and styrenic monomers; polyesters, oil-free alkyds, alkyds, and the like; polyurethanes, oil-modified polyurethanes and thermoplastic urethanes systems; epoxy systems; phenolic systems; cellulosic esters such as acetate butyrate, acetate propionate, and nitrocellulose; amino resins such as urea formaldehyde, melamine formaldehyde, and other aminoplast polymers and resins materials; natural gums and resins; rubber-based adhesives including nitrile rubbers which are copolymers of unsaturated nitriles with dienes, styrene-butadiene rubbers, thermoplastic rubbers, neoprene or polychloroprene rubbers, and the like.

In addition to the polymeric compound that may be contained in the solids fraction, conventional additives which are typically utilized in coatings may also be used. For example, pigments, pigment extenders, metallic flakes, fillers, drying agents, anti-foaming agents, and anti-skinning agents, wetting agents, ultraviolet absorbers, cross-linking agents, and mixtures thereof, may all be utilized in the coating formulation to be sprayed by the methods of the present invention.

In connection with the use of the various additives noted above, it is particularly desirable for pigments to be present in the coating formulation inasmuch as it has been found to aid in the diffusion of the supercritical fluid from the sprayed composition resulting in improved atomization.

In addition to the solids fraction, a solvent fraction is also typically employed in the coating formulations whether they be an adhesive composition or a paint, lacquer, varnish, or the like, or an agricultural spray, in order to act as a vehicle in which the solid fraction is transported from one medium to another. As used herein, the solvent fraction is comprised of essentially any active organic solvent and/or non-aqueous diluent which is at least partially miscible with the solids fraction so as to form either a solution, dispersion, or suspension. As used herein, an "active solvent" is a solvent in which the solids fraction is at least partially soluble. The selection of a particular solvent fraction for a given solids fraction in order to form a specific coating formulation for application by airless spray techniques is conventional and well known to those skilled in the art. In general, up to about 30% by weight of water, preferably up to about 20% by weight, may also be present in the solvent fraction provided that a coupling solvent is also present in the formulation. All such solvent fractions are suitable in the present invention.

A coupling solvent is a solvent in which the polymeric compounds used in the solids fraction is at least partially soluble. Most importantly, however, such a coupling solvent is also at least partially miscible with water. Thus, the coupling solvent enables the miscibility of the solids fraction, the solvent fraction and the water to the extent that a single phase is desirably maintained such that the composition may optimally be sprayed and a good coating formed.

Coupling solvents are well known to those skilled in the art and any conventional coupling solvents which are able to meet the aforementioned characteristics, namely, those in which the polymeric components of the solid fraction is at least partially soluble and in which water is at least partially miscible are all suitable for being used in the present invention.

Applicable coupling solvents which may be used in the present invention include, but are not limited to, ethylene glycol ethers; propylene glycol ethers; chemical and physical combinations thereof; lactams; cyclic ureas; and the like.

Specific coupling solvents (which are listed in order of most effectiveness to least effectiveness) include butoxy ethanol, propoxy ethanol, hexoxy ethanol, isopropoxy 2-propanol, butoxy 2-propanol, propoxy 2-propanol, tertiary butoxy 2-propanol, ethoxy ethanol, butoxy ethoxy ethanol, propoxy ethoxy ethanol, hexoxy ethoxy ethanol, methoxy ethanol, methoxy 2-propanol, and ethoxy ethoxy ethanol. Also included are lactams such as n-methyl-2-pyrrolidone, and cyclic ureas such as dimethyl ethylene urea.

When water is not present in the coating formulation, a coupling solvent is not necessary, but may still be employed. Other solvents, particularly active solvents, which may be present in typical coating formulations and which may be utilized in the present invention include ketones such as acetone, methyl ethyl ketone, methyl isobutyl ketone, mesityl oxide, methyl amyl ketone, cyclohexanone and other aliphatic ketones; esters such as methyl acetate, ethyl acetate, alkyl carboxylic esters; ethers, such as methyl t-butyl ether, dibutyl ether, methyl phenyl ether and other aliphatic or alkyl aromatic ethers; glycol ethers such as ethoxy ethanol, butoxy ethanol, ethoxy 2-propanol, propoxy ethanol, butoxy 2-propanol and other glycol ethers; glycol ether esters such as butoxy ethoxy acetate, ethyl 3-ethoxy propionate and other glycol ether esters; alcohols such as methanol, ethanol, propanol, iso-propanol, butanol, iso-butanol, amyl alcohol and other aliphatic alcohols; aromatic hydrocarbons such as toluene, xylene, and other aromatics or mixtures of aromatic solvents; aliphatic hydrocarbons such as VM&P naphtha and mineral spirits, and other aliphatics or mixtures of aliphatics; nitro alkanes such as 2-nitropropane. A review of the structural relationships important to the choice of solvent or solvent blend is given by Dileep et al., *Ind. Eng. Che.* (Product Research and Development) 24, 162, 1985 and Francis, A. W., *J. Phys. Chem.* 58, 1099, 1954.

Of course, there are solvents which can function both as coupling solvents as well as active solvents and the one solvent may be used to accomplish both purposes. Such solvents include, for example, butoxy ethanol, propoxy ethanol and propoxy 2-propanol. Glycol ethers are particularly preferred.

Suitable additives that are conventionally present in coating formulations that are intended for spray application may also be present in this invention, such as, curing agents, plasticizers, surfactants, and the like.

Generally, it is not until a sufficient amount of supercritical fluid is added to the coating formulation that the full feathered spray is obtained. Thus, at low concentrations of supercritical fluid, the airless spray still shows a fishtail effect inasmuch as the amount of supercritical fluid is not sufficient to produce the desired feathered spray. But as the concentration of supercritical fluid increases, there comes a point at which the spray undergoes a transition from a fishtail pattern to a feathered spray pattern that is usually accompanied by an improvement in the atomization of the spray which results in finer atomized droplets being obtained. This transition can be seen in the change in shape of the spray and in the change in the deposition of the spray upon the substrate.

The particular amount of supercritical fluids which is necessary to effect a complete transition from a fishtail pattern to a feathered spray pattern will be dependent upon the specific coating formulation, the particular supercritical fluid utilized, and the particular processing conditions. However, it is generally desirable to add as much supercritical fluid as possible to the admixture of coating formulation and supercritical fluid that can be accommodated by the spraying system without causing a decrease in spraying performance.

Typically, the preferred upper limit of supercritical fluid addition is that which is capable of being miscible with the coating formulation. This practical upper limit is generally recognizable when the admixture containing coating formulation and supercritical fluid breaks down into two fluid phases, one phase being the supercritical fluid phase and the other being the diluent fraction phase.

Figure 7:
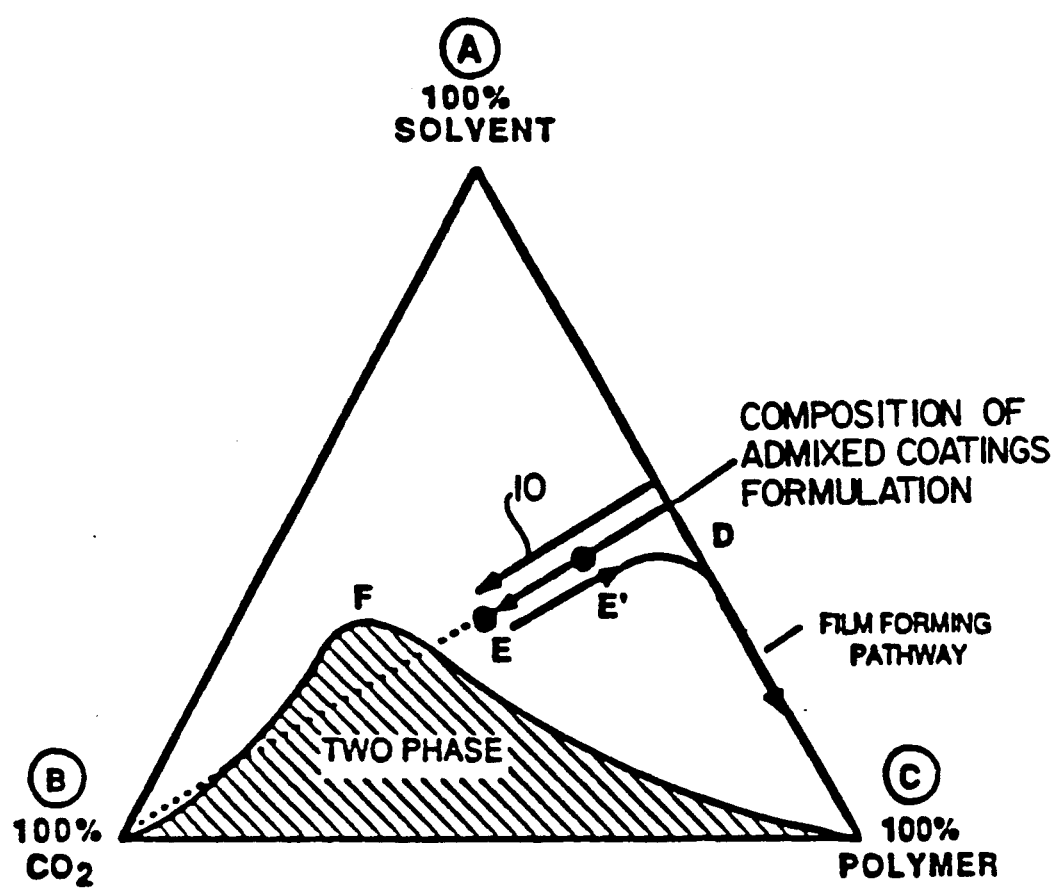
FIG. 7 is a phase diagram of supercritical carbon dioxide fluid spray coating.

To better understand this phenomenon, reference is made to the phase diagram in FIG. 7 wherein the supercritical fluid is supercritical carbon dioxide fluid. In FIG. 7, the vertices of the triangular diagram represent the pure components of an admixed coating formulation which for the purpose of this discussion contains no water. Vertex A is an organic solvent, vertex B is carbon dioxide, and vertex C represents a polymeric material. The curved line BFC represents the phase boundary between one phase and two phases. The point D represents a possible composition of a coating formulation in which supercritical carbon dioxide has not been added. The point E represents a possible composition of an admixed coating formulation, after admixture with supercritical carbon dioxide.

Thus, after atomization, a majority of the carbon dioxide vaporizes, leaving substantially the composition of the original coating formulation. Upon contacting the substrate, the remaining liquid mixture of the polymer and solvent(s) component(s) will flow, i.e., coalesce, to produce a uniform, smooth film on the substrate. The film forming pathway is illustrated in FIG. 7 by the line segments EE'D (atomization and decompression) and DC (coalescence and film formation).

However, the amount of supercritical fluid, such as supercritical carbon dioxide, that can be mixed with a coating formulation is generally a function of the miscibility of the supercritical fluid with the coating formulation as can best be visualized by referring to FIG. 7.

As can be seen from the phase diagram, particularly as shown by arrow 10, as more and more supercritical carbon dioxide is added to the coating formulation, the composition of the admixed liquid coating mixture approaches the two-phase boundary represented by line BFC. If enough supercritical carbon dioxide is added, the two-phase region is reached and the composition correspondingly breaks down into two fluid phases. Sometimes, it may be desirable to admix an amount of supercritical fluid (in this case, supercritical carbon dioxide) which is even beyond the two phase boundary. Generally, however, it is not preferable to go much beyond this two phase boundary for optimum spraying performance and/or coating formation.

Accordingly, the amount of supercritical fluid that is used in order to provide a feathered spray pattern is generally in an amount of at least about 15% based, upon the total weight of the admixed liquid mixture containing the solids fraction, the solvent fraction and the supercritical fluid, up to a preferred maximum of the solubility limit of the supercritical fluid which is generally identified by a breakup of the admixed liquid mixture into two phases. More preferably, the amount of supercritical fluid is present in amounts ranging from about 20 to 50 weight percent on the same basis.

In general, higher spray temperature lowers the concentration of supercritical fluid, such as supercritical carbon dioxide, required in the admixed liquid mixture to obtain transition to a feathered spray pattern. However, higher temperature also lowers the solubility of the supercritical fluid, so an optimum temperature exists. For supercritical carbon dioxide, the optimum spray temperature is generally in the range of 50 to 75 C.

Figure 3A:
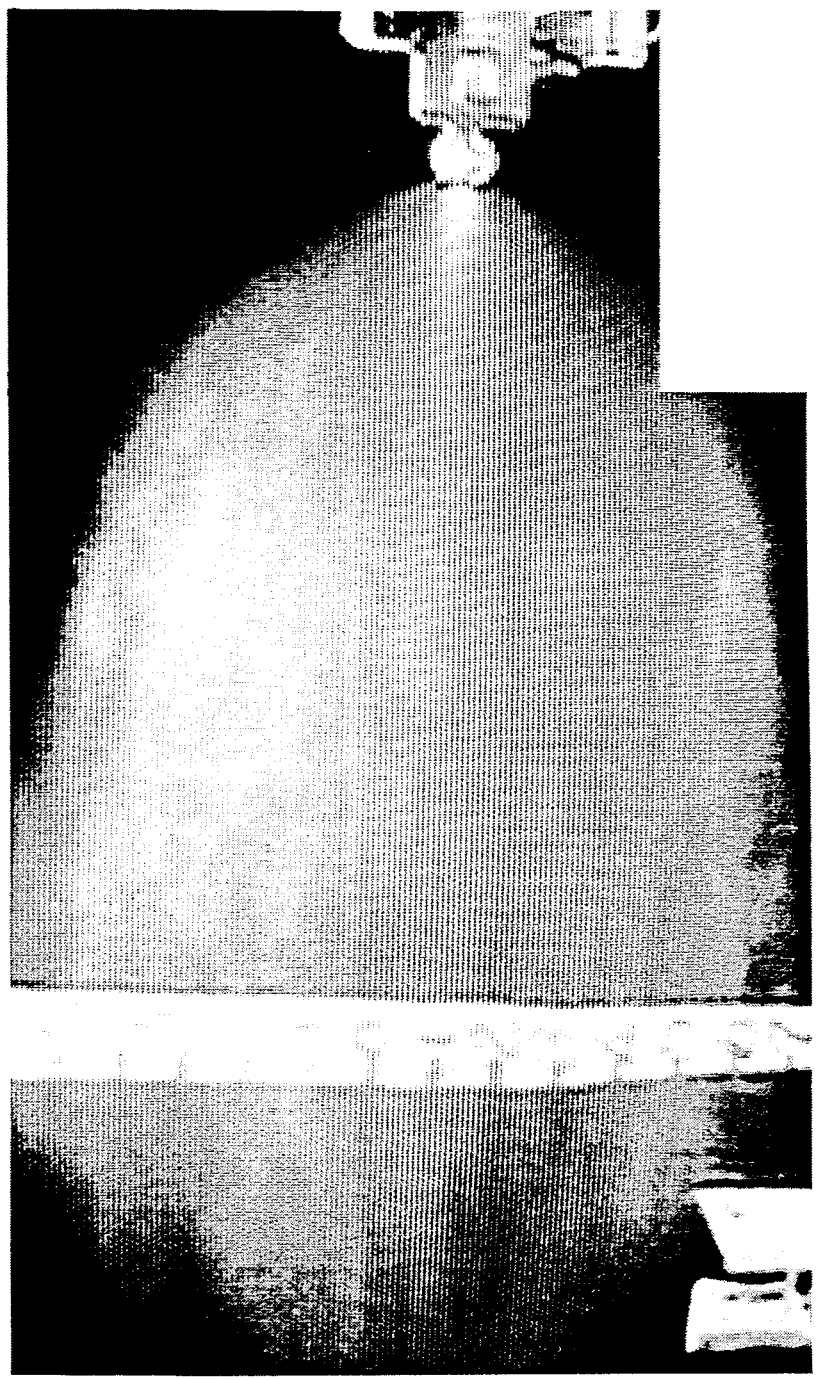
FIGS. 3a and 3b illustrate typical feathered spray fans with FIG. 3c showing the absence of a visible liquid film at the spray nozzle due to the explosive atomization characteristic of the feathered spray.
Figure 3B:
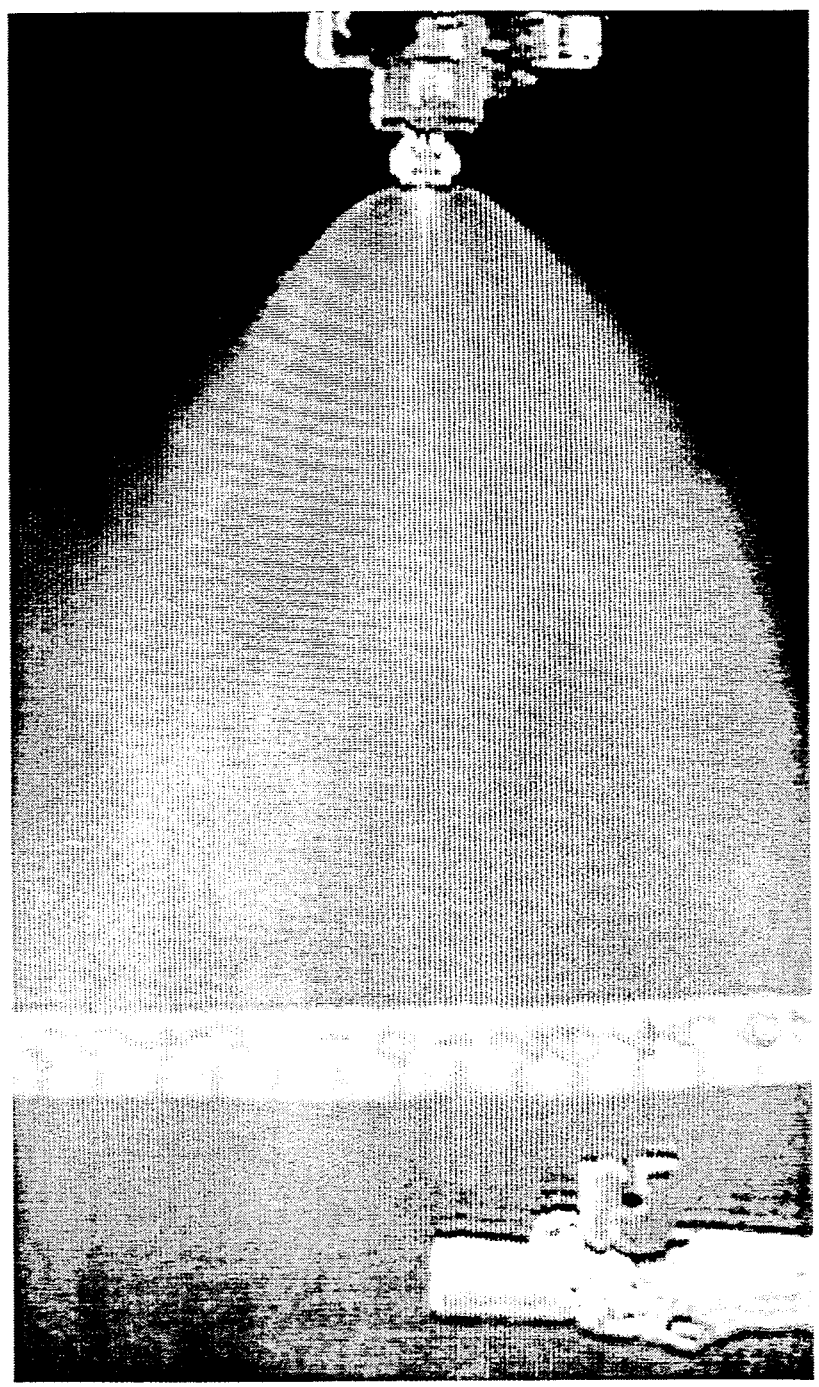
Figure 3C:
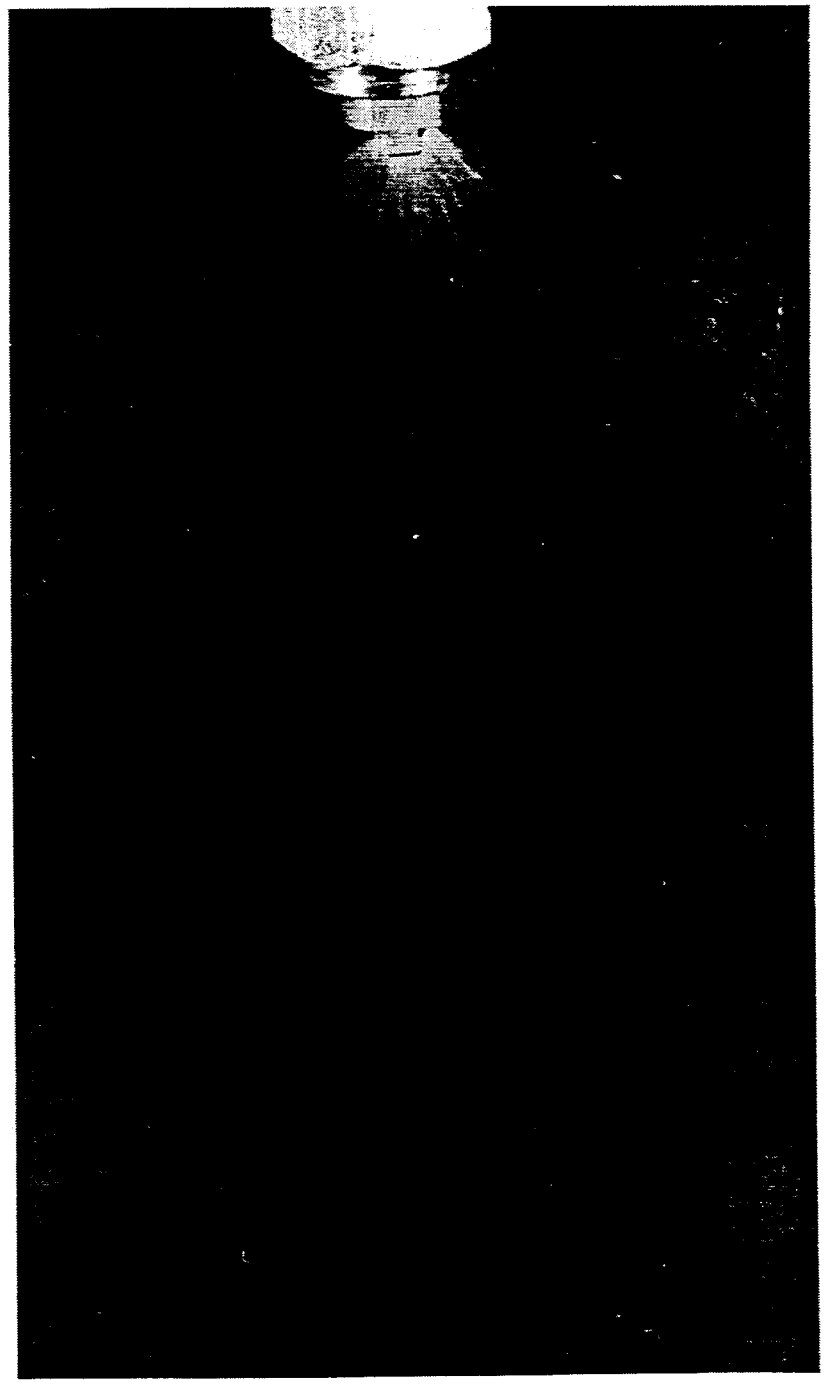
FIGS. 3 are photo reproductions of actual atomized liquid sprays containing a feathered spray pattern in accordance with the present invention.
FIG. 3d shows a narrower feathered fan with FIG. 3e showing the spray in FIG. 3d after rotating the plane of the spray by 90 degrees.
Figure 3D:
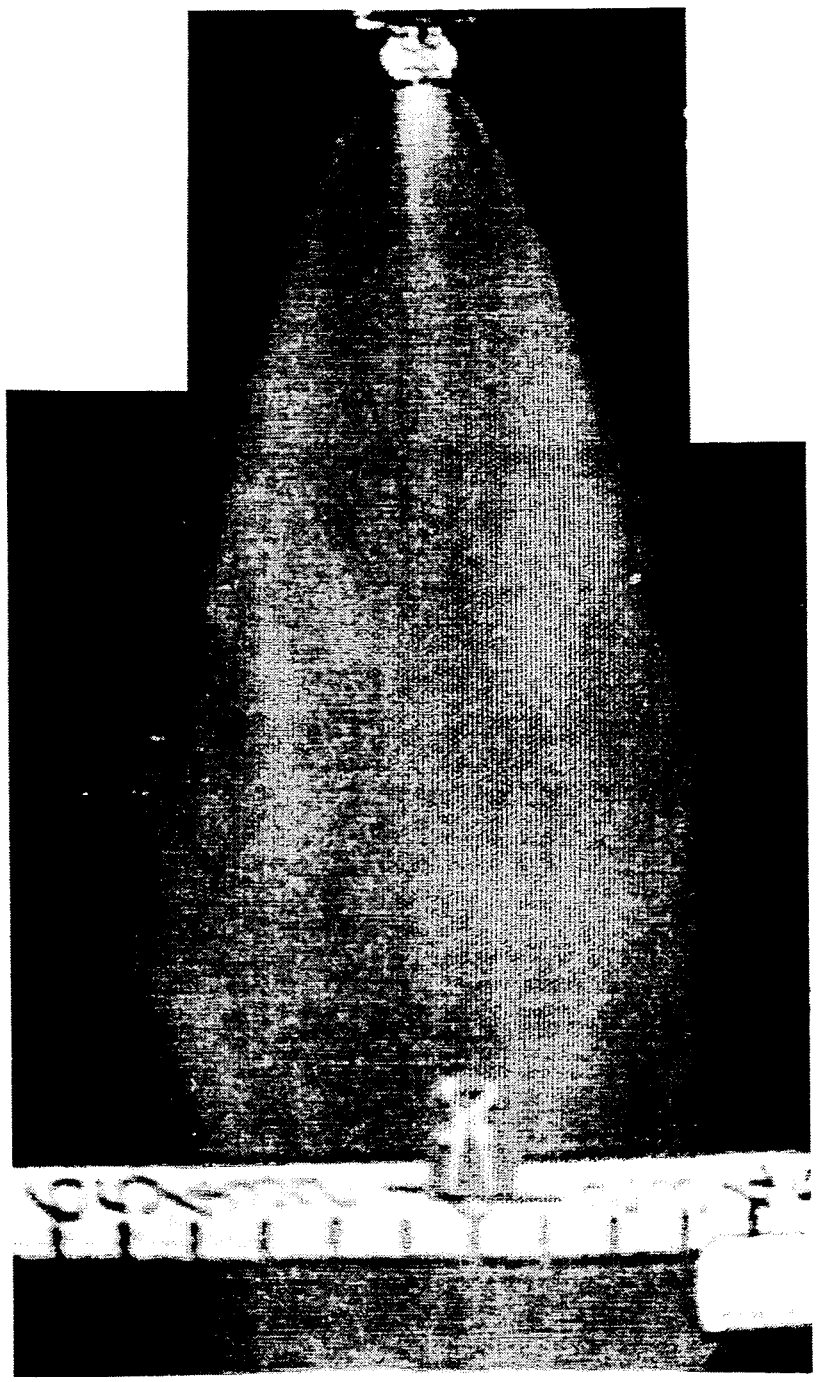
Figure 3E:
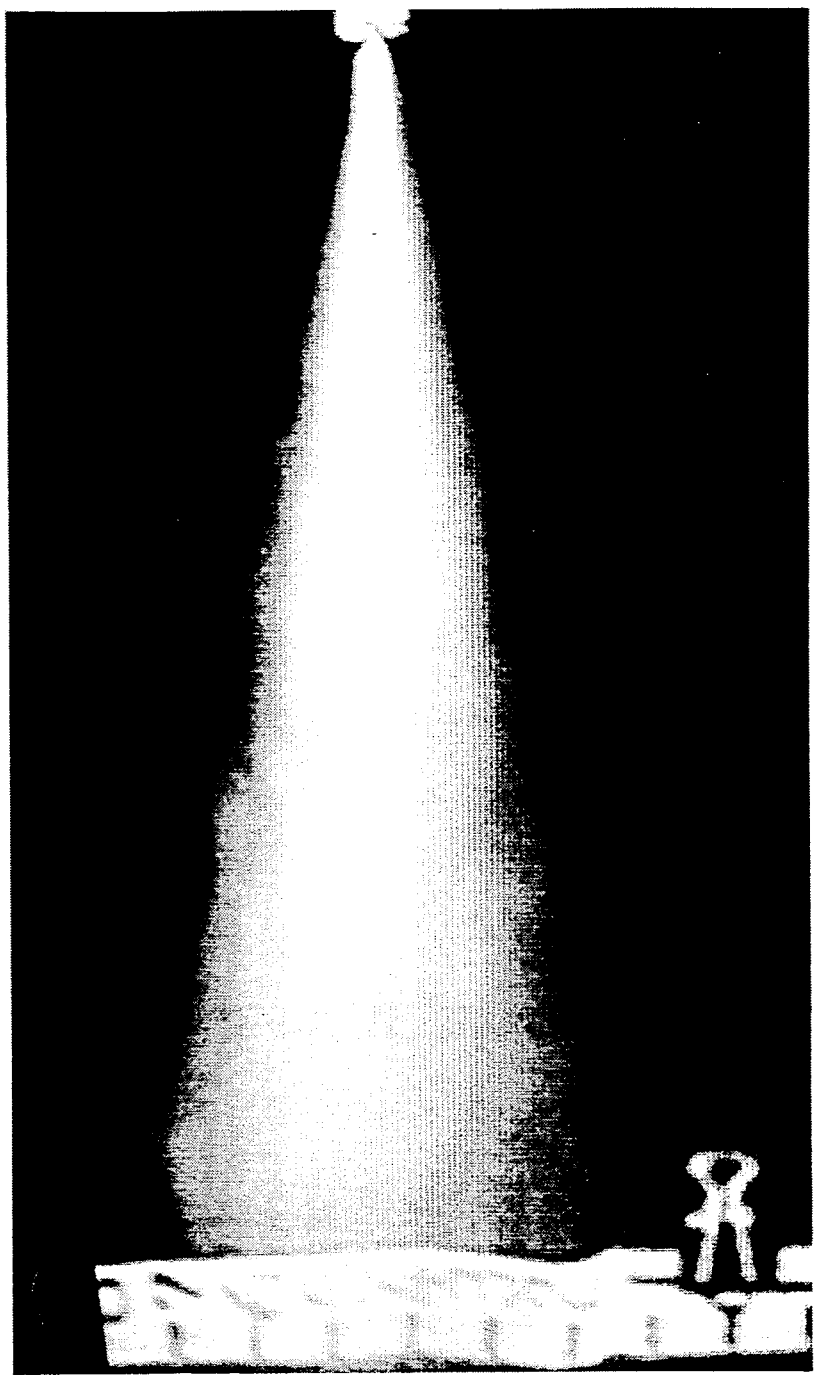
Figure 4A:
Figure 4B:
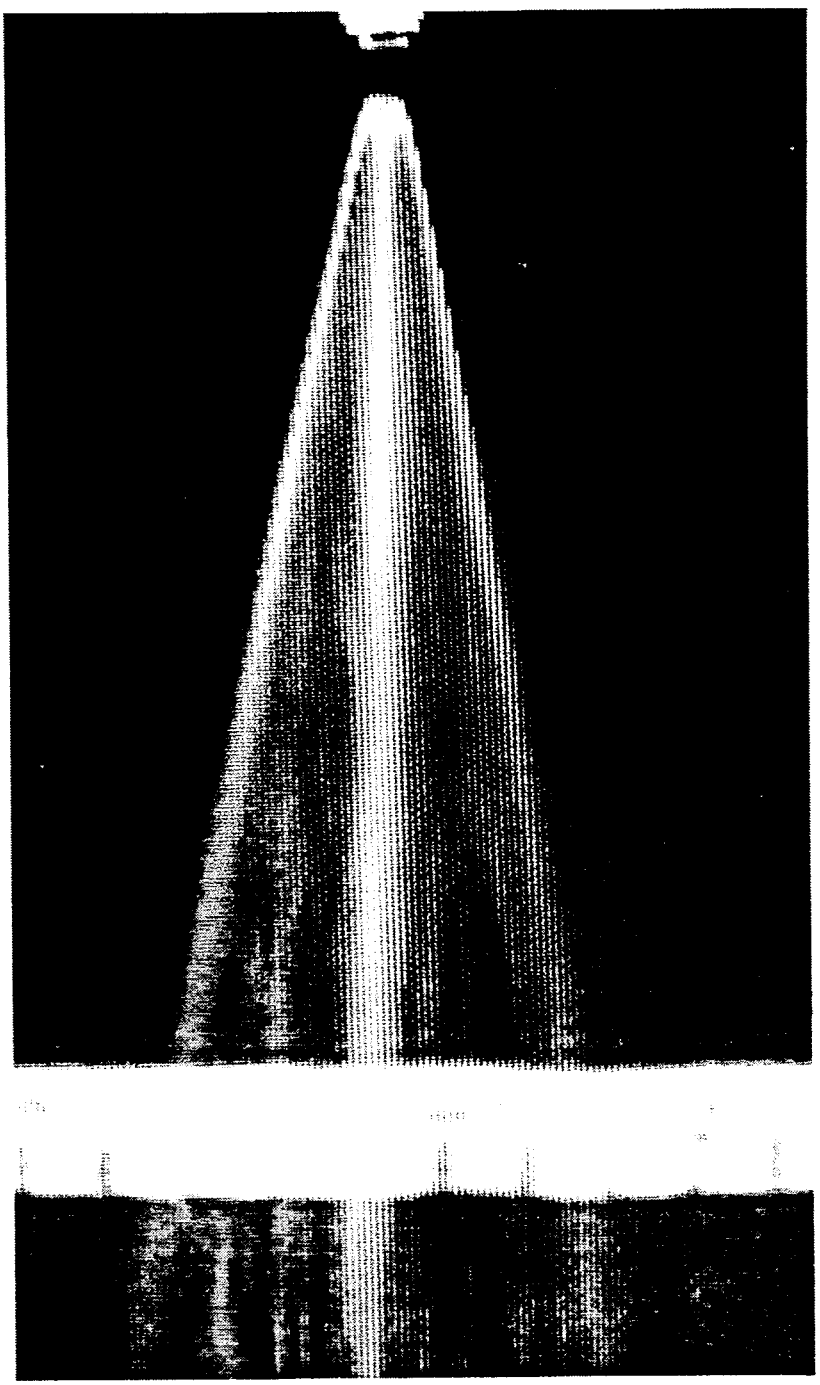
Figure 4D:
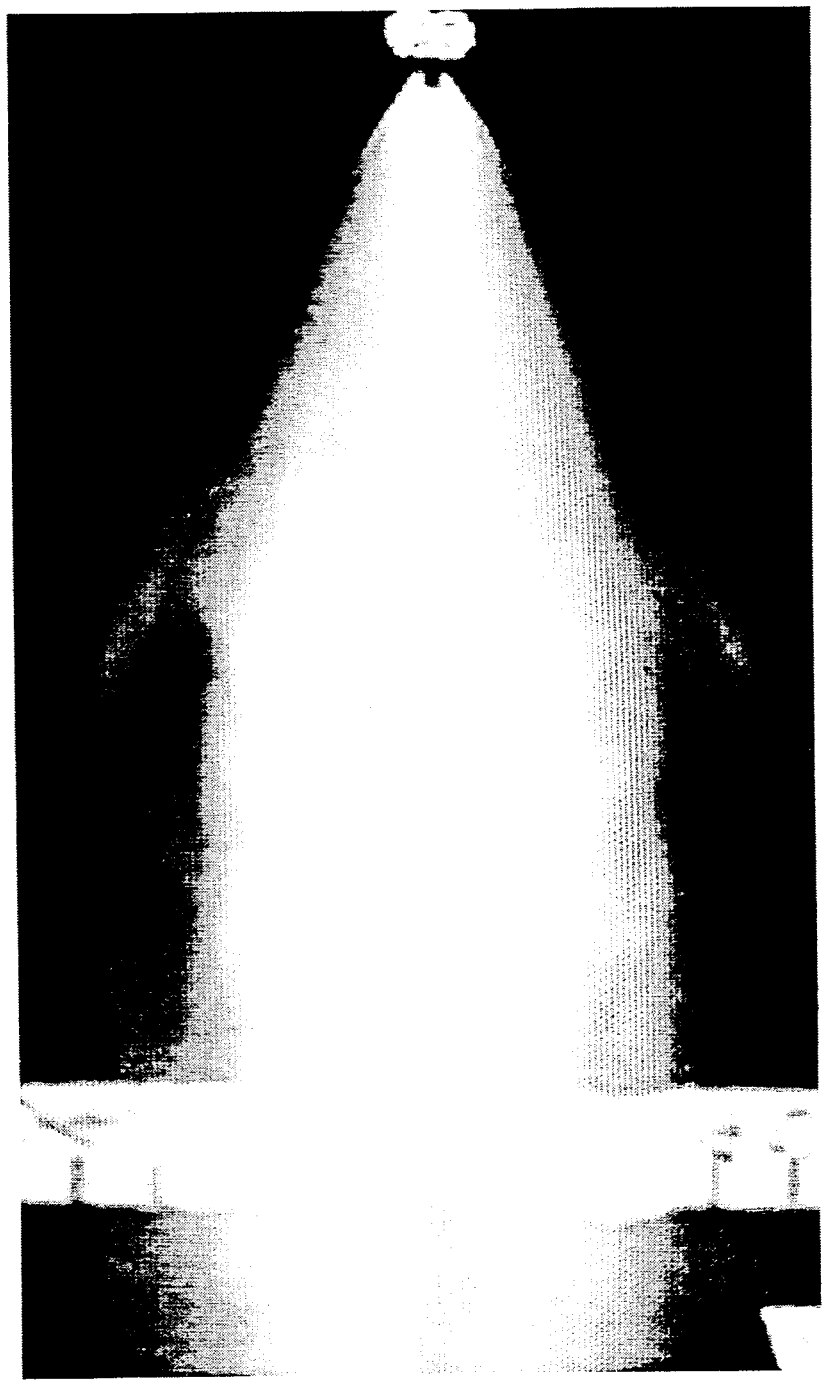

The effect of adding supercritical fluid to a sprayed coating formulation is vividly demonstrated in the photo reproductions shown in FIGS. 3 and 4. In FIG. 4, which is not in accordance with the present invention, coating formulations are sprayed without supercritical fluids and illustrate various types of fishtail sprays. FIGS. 4a and 4b show fishtail spray patterns in which the edges or margins of the spray pattern contain a higher concentration of spray material than interior portions of the spray. FIGS. 4c and 4d show fishtail spray patterns in which the edges or margins of the spray pattern have separated from the interior portion of the spray and jet out from the sides of the spray. The coherent liquid film that extends from the spray nozzle before atomization occurs can be seen, which is typical of airless atomization.

As more and more supercritical fluid is added, the spray pattern enters a transition phase in which ultimately a feathered spray pattern, such as illustrated in FIG. 3, is obtained. FIG. 3a shows a feathered spray pattern obtained with a polyester coating formulation sprayed at a supercritical carbon dioxide concentration of 25% at a spray temperature of 60 C and a pressure of 1600 psig. FIG. 3b shows a feathered spray pattern obtained with a cellulose acetate butyrate coating formulation sprayed at a supercritical carbon dioxide concentration of 37% at a spray temperature of 60 C and a pressure of 1600 psig. FIG. 3c shows a closeup of a feathered spray pattern obtained with an acrylic coating formulation sprayed at a supercritical carbon dioxide concentration of 28% at a spray temperature of 50 C and a pressure of 1600 psig. This shows the explosive atomization that occurs with the feathered spray, which causes the coherent liquid film to recede into the spray nozzle so that no liquid film is visible and atomization occurs at the spray orifice instead of away from it FIG. 3d shows a narrower feathered spray pattern obtained with an acrylic coating formulation sprayed at a supercritical carbon dioxide concentration of 30% at a spray temperature of 60 C and a pressure of 1600 psig. FIG. 3e shows the spray in FIG. 3d rotated ninety degrees, which shows that the spray is also feathered outwardly from the plane of the spray fan as in an air spray.

Figure 10A:
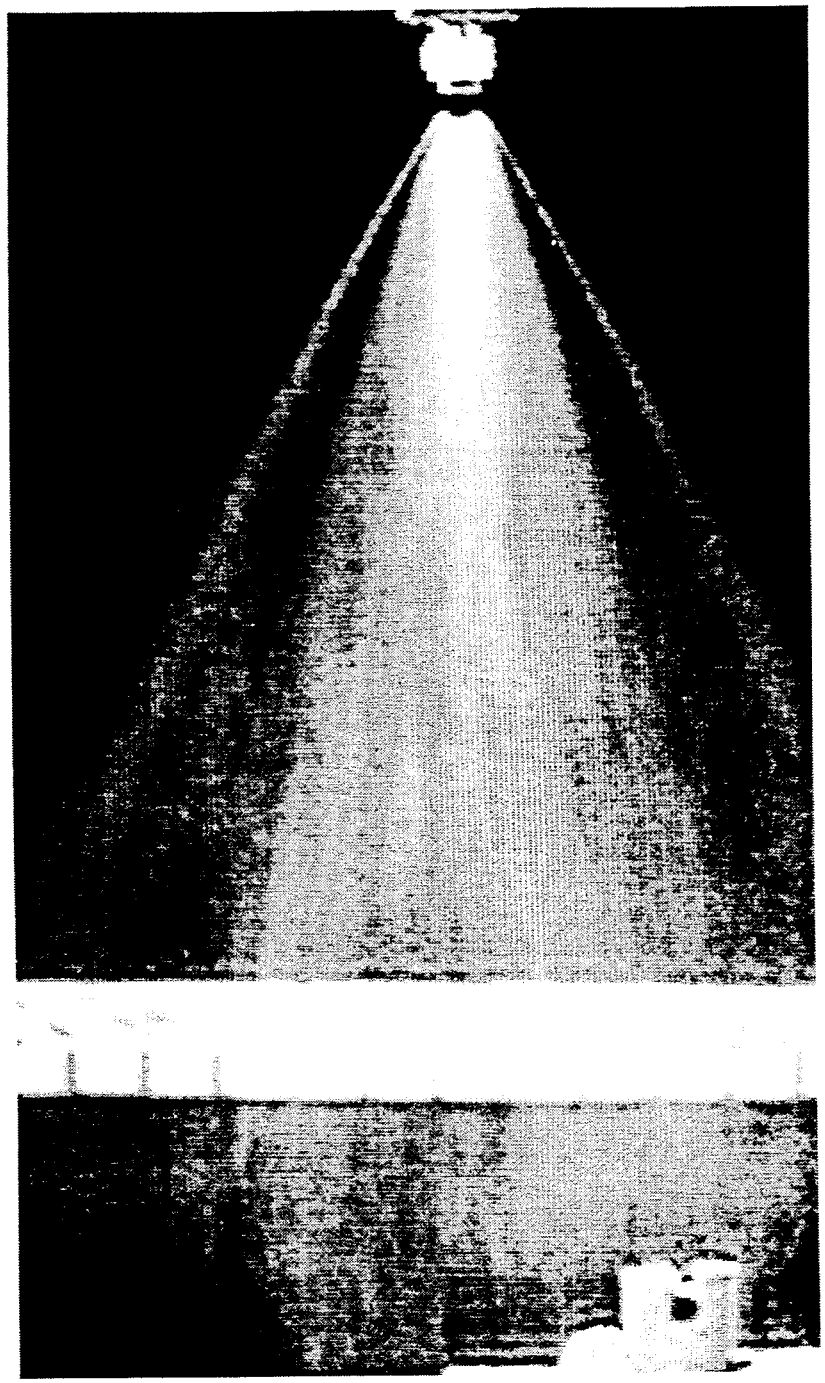
FIG. 10a shows the fishtail spray pattern obtained by airless spraying without supercritical carbon dioxide and which is not in accordance with the present invention.
Figure 10B:
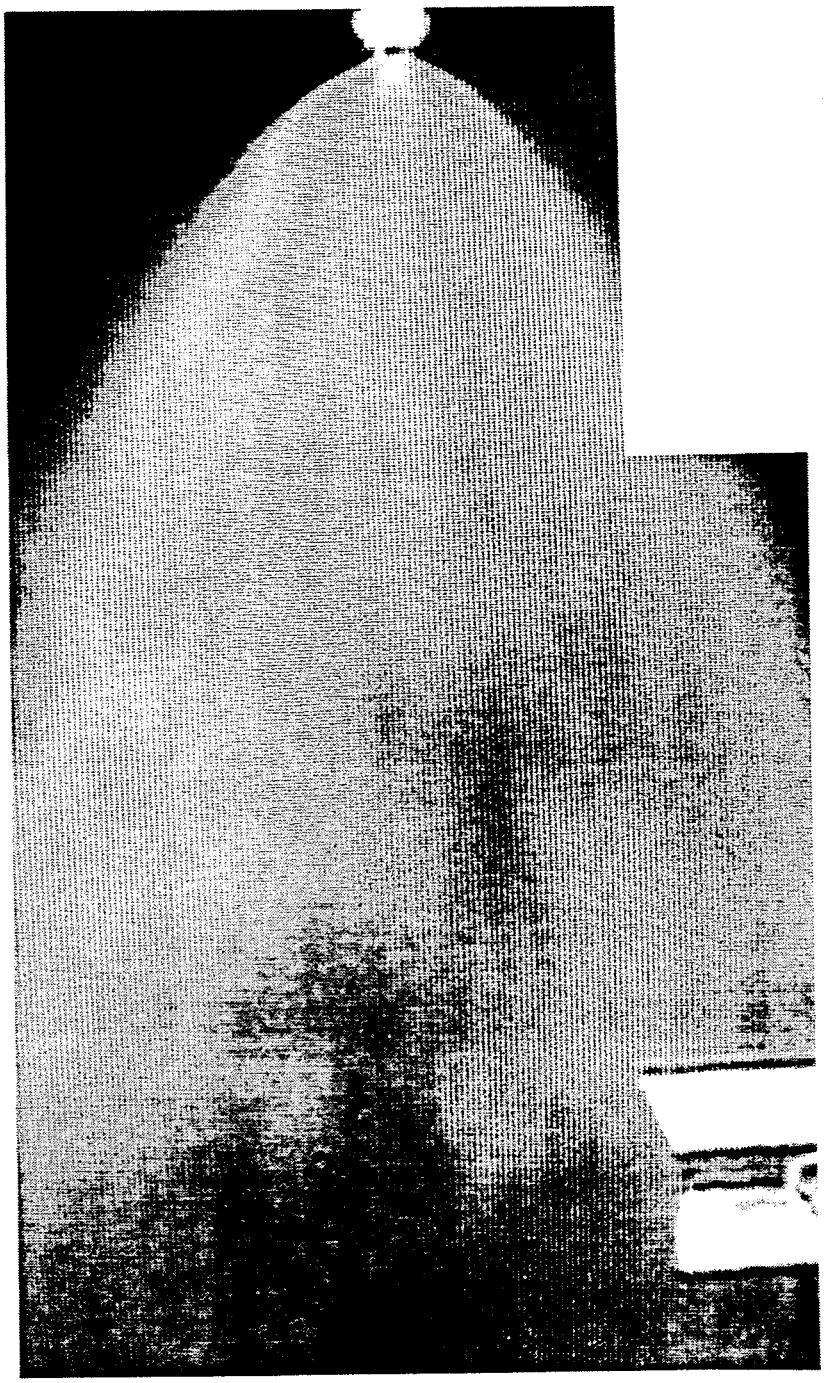
FIG. 10b shows the feathered spray pattern obtained by airless spraying with supercritical carbon dioxide in accordance with the present invention.

FIG. 10 shows sprays obtained with a cellulose acetate butyrate coating formulation, showing the fishtail spray obtained without supercritical fluid (FIG. 10a) and the feathered spray obtained with a 30% concentration of supercritical carbon dioxide (FIG. 10b) at a spray temperature of 60 C and pressure of 1600 psig.

FIG. 11 shows sprays obtained with an acrylic lacquer coating formulation, showing the fishtail spray pattern obtained when the supercritical fluid concentration and temperature are below the transition point (FIG. 11a), namely with 38% supercritical carbon dioxide and 53 C temperature, and the feathered spray pattern obtained when the supercritical fluid concentration and temperature are above the transition point (FIG. 11b), namely with 40% supercritical fluid concentration and 59 C temperature.

FIG. 12 shows sprays obtained with a thermosetting acrylic coating formulation, showing the stages of transition from a fishtail spray pattern at low supercritical carbon dioxide concentration to a feathered spray pattern at high supercritical carbon dioxide concentration, at constant spray temperature (60 C) and pressure (1600 psig). FIG. 12a shows the spray pattern present with 14% supercritical carbon dioxide. The fishtail side jets have nearly merged back into the central spray, but they are still evident., A liquid film can be seen jetting from the spray orifice before atomization occurs out in front of the orifice. FIG. 12b shows the spray pattern present with 19.7% supercritical carbon dioxide. The side jets have merged into the central spray and the liquid film has recessed into the orifice, but the spray shape still shows the effect of surface tension drawing the edges of the spray inward. FIG. 12c shows the spray pattern present with about 22% supercritical carbon dioxide. The spray pattern is clearly in the transition region as shown by the spray flaring outward somewhat from the plane of the fan in the center of the spray. The spray angle has become wider at the nozzle. FIG. 12d shows the spray pattern present with 25% supercritical carbon dioxide. The spray pattern has completed the transition to a feathered spray.

Without wishing to be bound by theory, it is believed that the explosive atomization that creates the feathered spray is produced by the dissolved supercritical fluid in the admixed liquid mixture suddenly becoming exceedingly supersaturated as the liquid mixture is sprayed from the spray nozzle and experiences sudden and large drop in pressure. This creates a large driving force for gasification of the dissolved supercritical fluid, which overcomes the surface tension forces that oppose atomization and bind the fluid flow together into a fishtail spray pattern.

Figure 2:
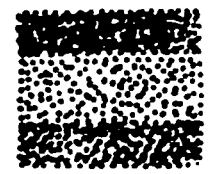
FIG. 2 is a diagrammatic illustration of a fishtail spray pattern coating layer which is not in accordance with the present invention.
Figure 6A:
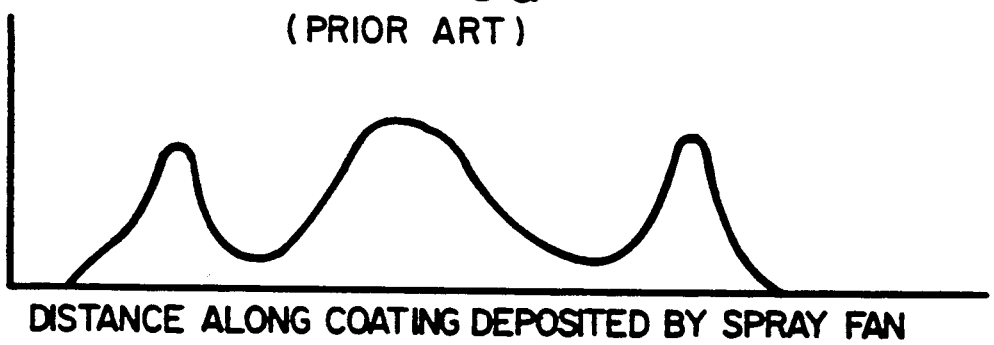
FIGS. 6a and 6b are graphs showing the thickness of actual deposited coating layers as a function of the distance from the uppermost portion of the sprayed coating layer which has been sprayed in a fishtail spray pattern which are not in accordance with the present invention.
Figure 6B:
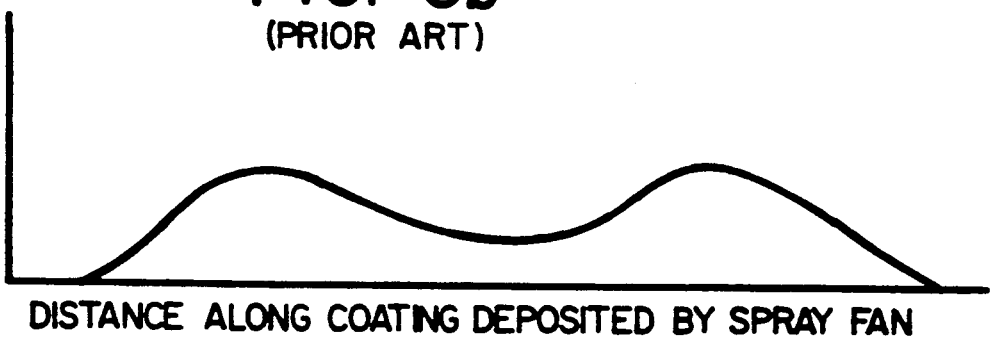

The characteristics of a coating which is obtained by spraying a fishtail pattern onto a substrate is demonstrated in FIGS. 2, 6a and 6b, respectively. In FIG. 2, a diagrammatic representation of the coated particles is shown in which the edges of the spray pattern contain a higher concentration of the particles than in the center. FIG. 6b clearly demonstrates this effect quantitatively by setting forth the thickness of the deposited layer as a function of the position on the coated substrate. FIG. 6a demonstrates quantitatively yet another, fishtail pattern that typically may be obtained on a substrate in which the innermost part of the pattern, as well as the edges also has an unusually high concentration of coated particles.

Figure 5:
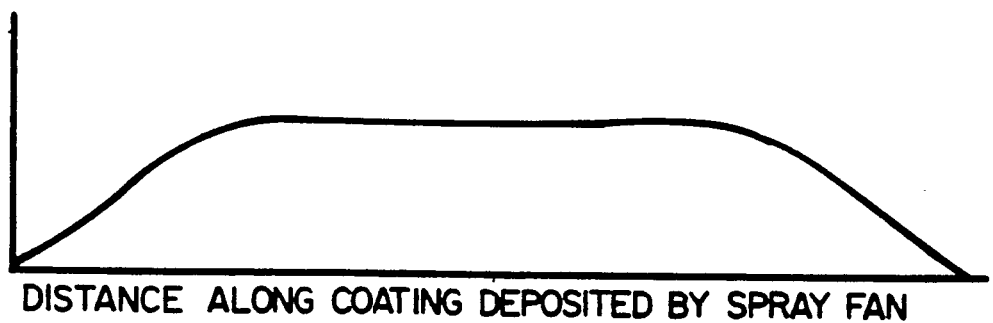
FIG. 5 is a graph showing the thickness of an actual deposited coating layer as a function of the distance from the uppermost portion of the sprayed coating layer which has been sprayed in a feathered spray pattern in accordance with the present invention.

In complete contrast thereto, by virtue of the present invention, a feathered spray pattern is obtained on a substrate coated with such a spray which is diagrammatically illustrated in FIGS. 1 and 5, respectively. FIG. 1 shows the margins of the spray pattern desirably containing less solid particles than in the center thereof, thereby permitting overlap of such coating layers to provide a uniform coating. This is also quantitatively illustrated in FIG. 5 where the thickness of the coating layer is set forth as a function of position on the coated layer.

The coating formulations, after having been admixed with supercritical fluid, is then sprayed by passing it under pressure through an orifice into the environment of the substrate to be sprayed.

An orifice is a hole or an opening in a wall or housing, such as in a spray tip of a spray nozzle on an electrostatic spray gun, through which the admixed liquid coating composition flows in going from a region of higher pressure, such as inside the spray gun, into a region of lower pressure, such as the air environment, outside of the spray gun and around the substrate. An orifice may also be a hole or an opening in the wall of a pressurized vessel, such as a tank or cylinder. An orifice may also be the open end of a tube or pipe or conduit through which the mixture is discharged. The open end of the tube or pipe or conduit may be constricted or partially blocked to reduce the open area.

Spray orifices, spray tips, spray nozzles, and spray guns used for conventional electrostatic airless and air-assisted airless spraying of coating formulations such as paints, lacquers, enamels, and varnishes, are suitable for spraying the precursor coating compositions of the present invention when admixed with supercritical fluids. Spray guns, nozzles, and tips are preferred that do not have excessive flow volume between the orifice and the valve that turns the spray on and off. The spray guns, nozzles, and tips must be built to contain the spray pressure used.

There are a broad variety of spray devices that one may use in spraying the coating formulation of the present invention after it has been admixed with supercritical fluid. Essentially, any spray gun may be used containing essentially any nozzle tip, from conventional airless and air-assisted airless spray devices to electrostatic spray devices. The choice of spray device is dependent upon the kind of application that is contemplated.

The material of construction of the orifice through which the admixed liquid mixture is sprayed must possess the necessary mechanical strength for the high spray pressure used, have sufficient abrasion resistance to resist wear from fluid flow, and be inert to chemicals with which it comes into contact. Any of the materials used in the construction of airless spray tips, such as boron carbide, titanium carbide, ceramic, stainless steel or brass, is suitable, with tungsten carbide generally being preferred.

The orifice sizes suitable for spraying the admixed liquid mixture should generally range from about 0.004-inch to about 0.072-inch diameter. Because the orifices are generally not circular the diameters referred to are equivalent to a circular diametrer. The proper selection is determined by the orifice size that will supply the desired amount of liquid coating and accomplish proper atomization for the coating. Generally, smaller orifices are desired at lower viscosity and larger orifices are desired at higher viscosity. Smaller orifices give finer atomization but lower output. Larger orifices give higher output but poorer atomization. Finer atomization is preferred in the practice of the present invention. Therefore, small orifice sizes from about 0.004-inch to about 0.025-inch diameter are preferred. Orifice sizes from about 0.007-inch to about 0.015-inch diameter are most preferred.

The designs of the spray tip that contains the spray orifice and of the sray nozzle that contains the spray tip are not critical The spray tips and spray nozzles should wave no protuberances near the orifice that would interfere with the spray.

The shape of the spray is also not critical to being able to spray the admixed liquid mixture. The spray may be in the shape of a cone that is circular or elliptical in cross section or the spray may be in the shape of a flat fan, but the spray is not limited to these shapes. Sprays that are flat fans or cones that are elliptical in cross section are preferred.

The distance from the orifice to the substrate is generally at a distance of from about 4 inches to about 24 inches. A distance of 6 inches to 18 inches is preferred. A distance of 8 inches to 14 inches is most preferred.

Devices and flow designs that promote turbulent or agitated flow in the liquid mixture prior to passing the liquid mixture under pressure through the orifice may also be used. Such techniques include but are nor limited to the use of pre-orifices, diffusers, turbulence plates, retractors, flow splitters/combiners, flow impingers, screens, baffles, vanes, and other inserts, devices, and flow networks that are used in electrostatic airless spray and air-assisted airless spray.

Filtering the liquid mixture prior to flow through the orifice is desirable in order to remove particulates that might plug the orifice. This can be done using conventional high-pressure paint filters. A filter may also be inserted at or in the gus and a tip screen may be in'-'seated at the spray tip to prevent orifice plugging. The size of the flow passages in the filter should be smaller than the size of the orifice, preferably significantly smaller.

Electrostatic forces may be used to increase the proportion of coating formulation that is deposited onto a substrate from the spray. This is commonly referred to as increasing the transfer efficiency. This is done by using a high electrical voltage relative to the substrate to impart an electrical charge to the spray This creates an electrical force of attraction between the spray droplets and the substrate, which causes droplets that would otherwise miss the substrate to be deposited onto it. When the electrical force causes droplets to be deposited on the edges and backside of the substrate, this effect is commonly referred to as wrap around.

Preferably the substrate is grounded, but it may also be charged to the opposite sign as the spray. The substrate may be charged to the same sign as the spray, but at a lower voltage with respect to ground, but this is of less benefit, because this produces a weak electrical force of attraction between the spray and the substrate than if the substrate were electrically grounded or charged to the opposite sign. Electrically grounding the substrate is the safest mode of operation. Preferably the spray is charged negative relative to electrical ground.

The method of charging the spray is not critical to the practice of the invention provided the charging method is effective. The coating formulation can be electrically charged by applying high electrical voltage relative to the substrate and electrical current (1) within the spray gun, by direct contact with electrified walls or internal electrodes before leaving the orifice; (2) after the spray emerges from the orifice, by electrical discharge from external electrodes located near the orifice and close to the spray; or (3) away from the orifices by passing the spray through or between electrified grids or arrays of external electrodes before the spray is deposited onto the substrate. Methods (1) and (2), individually or in combination, are preferred. Method (2) is most preferred.

In charging method (1) above, the spray gun must be electrically insulating. The high voltage and electrical current is supplied to the admixed liquid mixture inside the gun by direct contact with as internal surface that is electrically conducting and electrified. This may be part of the wall of the flow conduit inside the gun or internal electrodes that extend into the flow or a combination of electrified elements, including the spray nozzle. The contact area must be large enough to transfer sufficient electrical charge to the admixed liquid mixture as it flows through the gun. This internal charging method has the advantage of having to external electrode that could interfere with the spray. A disadvantage is that if the admixed liquid mixture is not sufficiently. electrically insulating, electrical current leakage can occur through the admixed liquid mixture to a grounded feed supply tank or feed delivery system. This reduces the amount of charge going to the spray. If current leakage is to high, then the feed supply tank and feed delivery system must be insulated from electrical ground, that is, be charged to high voltage. Current leakage can be measured by measuring the current flow from the high voltage electrical power supply without fluid flow. The current charging the spray is then the different between the current with fluid flow and the current without fluid flow. The leakage current should be small compared to the charging current.

In charging method (2) above, the spray is electrically charged after it energies from the orifice or in the vicinity of the orifice. The spray gun and spray nozzle must be electrically insulating. The electrical charge is supplied from external electrode(s) close to the spray tip and adjacent to the spray. Under high electrical voltage, electrical current is discharged to the spray. The preferred electrodes are one or more metal wire(s) positioned adjacent to the spray. The electrodes may be either parallel to the spray or perpendicular to it or any orientation in between such that the electrical current issuing from the sharp point is favorably directed to the spray. The electrode(s) must be positioned close enough to the spray, preferably within one centimeter, to effectively charge the spray without interfering with the flow of the spray. The electrodes may be sharp pointed and may be branched. For planar sprays, one or more electrodes are preferably located to the side(s) of the planar spray so that electrical current is discharged to the face(s) of the spray. For oval sprays, one or more electrodes are located adjacent to the spray around the perimeter. The electrode(s) are located to effectively charge the spray. One or more auxiliary electrodes, which may be at a different voltage than the primary electrode(s) or electrically grounded, may be used to modify the electrical field or current between the primary electrode(s) and the spray. For example, a primary charging electrode may be on one side of the spray fan and a grounded insulated auxiliary electrode may by on the opposite side of the spray fan. Charging method (2) has the advantage of less current leakage through the admixed liquid mixture than charging method (1). Admixed liquid mixtures that are sufficiently conductive must have the feed supply and feed line insulated from electrical ground. In charging method (3) above, the spray is electrically charged farther away from the orifice and is more fully dispersed than in method (2). Therefore a larger system or network of external electrodes is usually required in order to effectively charge the spray. Therefore the method is less safe and less versatile. Also the distance between the electrodes and spray must be greater to avoid interfering with the spray. Therefore the charge applied to the spray is likely to be lower. But current leakage through the supply lines is eliminated. The spray is passed through or between electrified grids or arrays of external electrodes before the spray is deposited onto the substrate. The spray droplets are charged by ion bombardment from the electrical current discharged into air from the electrodes. The electrified grid may be one or several wire electrodes that extend across the spray area. Current can discharge from along the length of the electrodes. The electrified array may be one or several wire or pointed electrodes positioned around the spray area and which extend close to or into the spray such that current discharges from the ends of the electrodes.

The present invention can be used with high electrical voltage in the range of about 30 to about 150 kilovolts. Higher electrical voltages are favored to impart higher electrical charge to the spray to enhance attraction to the substrate, but The voltage level must be safe for the type of charging and spray gun used. For safety reasons, the voltage of hand spray guns is usually restricted to less than 70 kilovolts and the equipment is designed to automatically shut off the voltage when the current exceeds a safe level. Generally for hand spray guns the useful range of electrical current is between 20 and 200 microamperes and optimum results are obtained with coating formulations that have very low electrical conductivity, that is, very high electrical resistance. For automatic spray guns that are used remotely, higher voltages and electrical currents can be safely used than for hand spray guns. Therefore the voltage can exceed 70 kilovolts up to 150 kilovolts and the current can exceed 200 microamperes.

These methods of electrostatic charging are known to those who are skilled in the art of electrostatic spraying.

For electrostatic spraying, the substrate is preferably an electrical conductor such as metal. But substrates that are not conductors or semiconductors can also be sprayed. Preferably they are pretreated to create an electrically conducting surface. For instance, the substrate can be immersed in a special solution to impart conductivity to the surface.

The method of generating the high electrical voltage and electrical current is not critical to the practice of the current invention. Conventional high voltage electrical power supplies can be used. The power supply should have standard safety features that prevent current or voltage surges. The electrical power supply may be built into the spray gun. Other charging methods may also be used.

The spray pressure used is a function of the coating formulation, the supercritical fluid being used, and the viscosity of the liquid mixture. The minimum spray pressure is at or slightly below the critical pressure of the supercritical fluid. Generally, the pressure will be below 5000 psi. Preferably, the spray pressure is above the critical pressure of the supercritical fluid and below 3000 psi. If the supercritical fluid is supercritical carbon dioxide fluid, the preferred spray pressure is between 1070 psi and 3000 psi. The most preferred spray pressure is between 1200 psi and 2500 psi.

The spray temperature used is a function of the coating formulation, the supercritical fluid being used, and the concentration of supercritical fluid in the liquid mixture. The minimum spray temperature is at or slightly below the critical temperature of the supercritical fluid. The maximum temperature is the highest temperature at which the components of the liquid mixture are not significantly thermally degraded during the time that the liquid mixture is at that temperature.

If the supercritical fluid is supercritical carbon dioxide fluid, because the supercritical fluid escaping from the spray nozzle could cool to the point of condensing solid carbon dioxide and any ambient water vapor present due to high humidity in the surrounding spray environment, the spray composition is preferably heated prior to atomization. The minimum spray temperature is about 31° centigrade. The maximum temperature is determined by the thermal stability of the components in the liquid mixture. The preferred spray temperature is between 35° and 90° centigrade. The most preferred temperature is between 45° and 75° centigrade. Generally, liquid mixtures with greater amounts of supercritical carbon dioxide fluid require higher spray temperatures to counteract the greater cooling effect.

The spray temperature may be obtained by heating the liquid mixture before it enters the spray gun, by heating the spray gun itself, by circulating the heated liquid mixture to or through the spray gun to maintain the spray temperature, or by a combination of methods. Circulating the heated liquid mixture through the spray gun is preferred, to avoid heat loss and to maintain the desired spray temperature. Tubing, piping, hoses, and the spray gun are preferably insulated or heat traced to prevent heat loss.

The environment into which the admixed coating composition is sprayed is not critical. However, the pressure therein must be less than that required to maintain the supercritical fluid component of the liquid spray mixture in the supercritical state. Preferably, the admixed liquid coating composition is sprayed in air under conditions at or near atmospheric pressure. Other gas environments can also be used, such as air with reduced oxygen content or inert gases such as nitrogen, carbon dioxide, helium, argon, xenon, or a mixture. Oxygen or oxygen enriched air is not desirable, because oxygen enhances the flammability of organic components in the spray.

Generally, liquid spray droplets are produced which generally have an average diameter of one micron or greater. These liquid droplets contain a portion of the solids fraction, a portion of the solvent fraction, and a portion of the supercritical fluid. Preferably, these droplets have average diameters of from about 5 to 1000 microns. More preferably, these droplets have average diameters of from about 10 to about 300 microns. Small spray droplets are desirable to vent the supercritical fluid from the spray droplet before impacting the substrate. Small spray droplets also give higher quality finishes.

The processes of the present invention may be used to apply coatings by the application of liquid spray to a variety of substrates. Examples of suitable substrates include but are not limited to metal, wood, glass, plastic, paper, cloth, ceramic, masonry, stone, cement, asphalt, rubber, and composite materials, and agriculturally related substrates.

Through the practice of the present invention, films may be applied to substrates such that the cured films have thicknesses of from about 0.2 to about 6.0 mils. Preferably, the films have thicknesses of from about 0.5 to about 2.0 mils, while most preferably, their thicknesses range from about 0.7 to about 1.5 mils.

If curing of the coating composition present upon the coated substrate is required, it may be performed at this point by conventional means, such as allowing for evaporation of the active and/or coupling solvent, application of heat or ultraviolet light, etc.

Compressed gas may be utilized to assist formation of the liquid spray and/or to modify the shape of the liquid spray that comes from the orifice. The assist gas is typically compressed air at pressures from 5 to 80 psi, with low pressures of 5 to 20 psi preferred, but may also be air with reduced oxygen content or inert gases such as compressed nitrogen, carbon dioxide, helium, argon, or xenon, or a mixture. Compressed oxygen or oxygen enriched air is not desirable because oxygen enhances the flammability of the organic components in the spray. The assist gas is directed into the liquid spray as one or more high-velocity jets of gas, preferably arranged symmetrically on each side of the liquid spray to balance each other. The assist gas jets will preferably come from gas orifices built into the electrostatic spray tip and/or nozzle. The assist gas may also issue from an opening in the spray tip or nozzle that is a concentric annular ring that is around and centered on the liquid orifice, to produce a hollow-cone high-velocity jet of gas that converges on the liquid spray, but this creates a larger flow of assist gas that is not as desirable. The concentric annular ring may be divided into segments, to reduce gas flow rate, and it may be elliptical instead of circular, to shape the spray. Preferably, the flow rate and pressure of the assist gas are lower than those used in air spray. The assist gas may be heated to counteract the rapid cooling effect of the supercritical fluid diluent in the spray. The preferred temperature of heated assist gas ranges from about 35° to about 90° centigrade. The most preferred temperature ranges from about 45° to about 75° centigrade.

Figure 8:
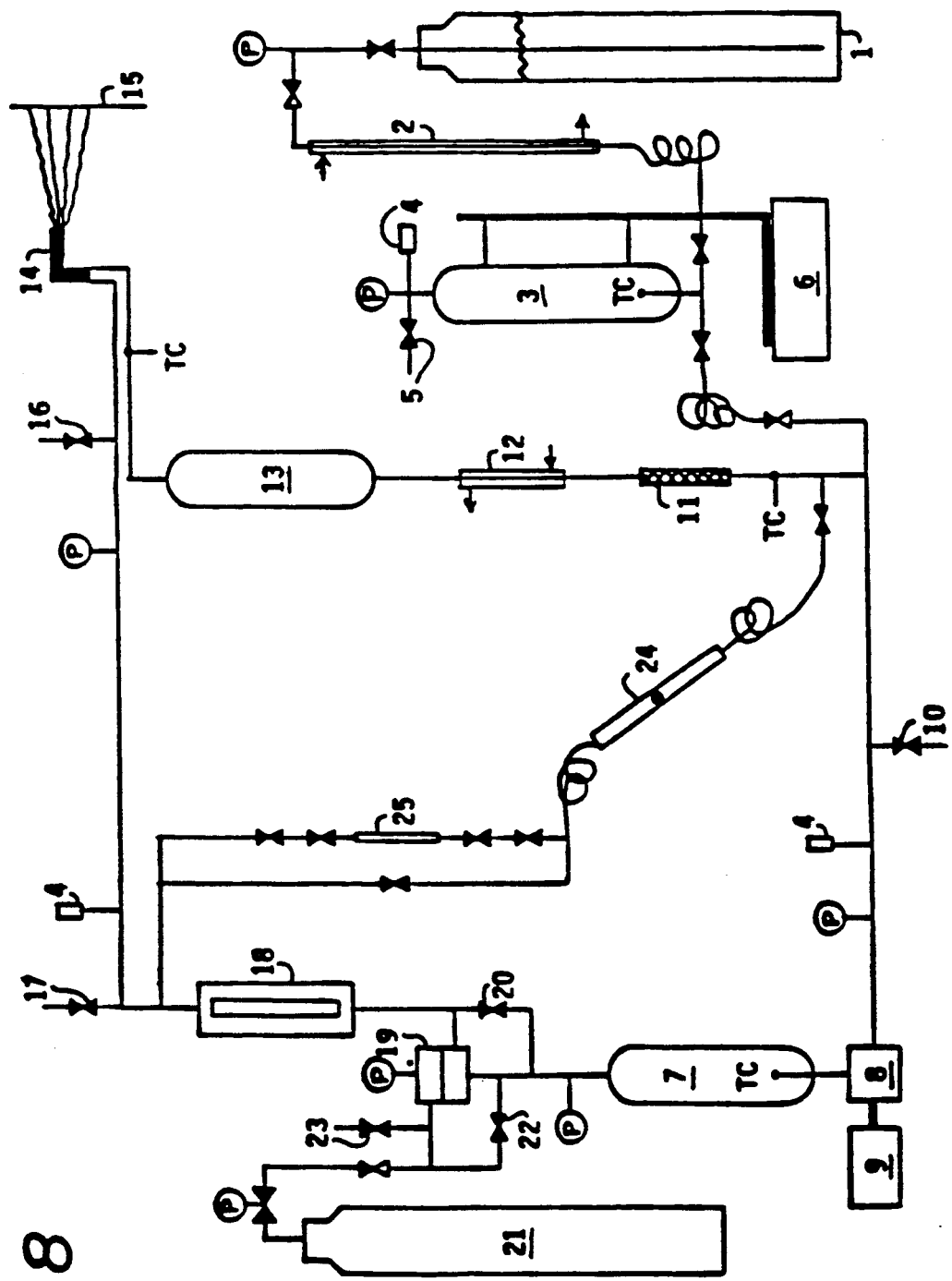
FIG. 8 is a schematic diagram of a spray apparatus that can be used for spraying the liquid mixture of coating formulation and supercritical fluid.

The coating formulations may be admixed with a supercritical fluid and then sprayed to produce a feathered spray pattern by a spray apparatus such as that shown in either FIGS. 8 or 9.

The following illustrates apparatus that may be used to obtain the admixed coating composition of precursor coating composition and supercritical fluid and spray it in a batch mode in the practice of the present invention. The supercritical fluid illustrated is supercritical carbon dioxide fluid.

Table 3 contains a listing of the equipment used in conducting the procedure described for the batch mode.

TABLE 3

| Item # | Description |
|---|---|
| 1. | Linde bone-dry-grade liquid carbon dioxide in size K cylinder with eductor tube. |
| 2. | Refrigeration heat exchanger. |
| 3. | Hoke cylinder #8HD3000, 3.0-liter volume, made of 304 stainless steel, having double end connectors, 1800-psig pressure rating, mounted on scale; carbon dioxide feed tank. |
| 4. | Circle Seal ™ pressure relief valve P168-344-2000 set at 1800 psig. |
| 5. | Vent valve. |
| 6. | Sartorius 16-kilogram scale with 0.1-gram sensitivity. |
| 7. | Hoke cylinder #8HD2250, 2.25-liter volume, made of 304 stainless steel, having double end connectors, 1800-psig pressure rating; pump supply tank. |
| 8. | Zenith single-stream gear pump, model #HLB-5592-30CC, modified by adding a thin Grafoil ™ gasket to improve metal-to-metal seal. |
| 9. | Zenith gear pump drive model #4204157, with 15:1 gear ratio, and pump speed controller #QM-371726F-15-XP, with speed range of 6 to 120 revolutions per minute. |
| 10. | Drain from circulation loop. |
| 11. | Kenics static mixer. |
| 12. | Cooling water heat exchanger. |
| 13. | Hoke cylinder #8HD2250, 2.25-liter volume, made of 304 stainless steel, having double end connectors, 1800-psig pressure rating; spray supply tank. |
| 14. | Airless spray gun. |
| 15. | Bonderite ™ 37 polished 24-gauge steel panel, 6-inch by 12-inch size. |
| 16. | Vent valve. |
| 17. | Liquid feed valve. |
| 18. | Jerguson high-pressure sight glass series T-30 with window size #6 rated for 2260 psig pressure at 200° F. temperature. |
| 19. | Grove back-pressure regulator #5-90-W, rated for 2000 psig at 200° F. temperature; dome is charged with pressurized nitrogen to desired spray pressure. |
| 20. | Bypass valve. |
| 21. | Pressurized nitrogen to set Grove back-pressure regulator and to purge unit. |
| 22. | Nitrogen purge valve. |
| 23. | Nitrogen vent valve. |
| 24. | Ruska rolling-ball high-pressure viscometer #1602-811-00 with temperature controller and electronic timer. |
| 25. | Pyncnometer, double-valved one-quarter-inch high-pressure tubing. |

The apparatus listed in Table 3 above is assembled as shown in the schematic representation contained in FIG. 3. Rigid connections are made with ⅛-inch diameter high-pressure tubing for gas flows and with ¼-inch diameter high-pressure tubing for liquid flows, using Swagelock TM fittings. The spray gun is connected to the tubing by using two Graco flexible ¼-inch static-free nylon high-pressure hoses model #061-214 with 5000-psi pressure rating. Check valves are used to prevent back flow to the carbon dioxide feed tank (3) and bulk supply tank (1) and to the nitrogen cylinder (21). The circulation loop and carbon dioxide feed tank are protected from overpressurization by pressure relief valves (4).

The apparatus consists of a circulation loop, a carbon dioxide feed system, and a side loop to measure viscosity and density. The circulation loop contains a pump supply tank (7), a gear pump (8) to provide circulation and maintain constant spray pressure, a static mixer (11), a cooler (12) to remove excess heat, a spray supply tank (13), an airless spray gun (14), a sight glass (18), and a pressure regulator (19) to maintain constant spray pressure. The pressure regulator (19) is set by using compressed nitrogen (21) regulated to the desired flow pressure. The carbon dioxide feed system contains a carbon dioxide bulk supply cylinder (1), a refrigeration heat exchanger (2), and a carbon dioxide feed tank (3) mounted on an electronic scale (6). The feed and exit lines to the feed tank (3) are coiled so that the force of the tank moving on the scale does not affect the scale reading. The side loop contains a viscometer (24) and pyncnometer (25) for measuring the viscosity and density of the admixed coating composition, if desired.

All flow lines and tanks are lined with electrical heat tape and covered with insulation to heat the solution to spray temperature. The heat tape is divided into several circuits that are controlled independently:

| Circuit #1 | Pressure regulator (19), bypass line (20), sight glass (18), and connecting lines. |
|---|---|
| Circuit #2 | Pump supply tank (7), gear pump (8), and line in circulation loop to carbon dioxide feed point. |
| Circuit #3 | Line in circulation loop from carbon dioxide feed point to cooler (12). |
| Circuit #4 | Spray supply tank (13). |
| Circuit #5 | Line from spray supply tank (13) to flexible hose connected to spray gun (14). |
| Circuit #6 | Carbon dioxide feed tank (3). |

Thermocouples located within the tanks and lines measure temperature. Admixed coating composition temperature is kept uniform around the loop by rapid circulation and by adjusting the heat tapes.

The batch spray unit is filled by the following procedure. The unit is evacuated through the circulation loop vent (16) and a weighed amount of precursor coating composition is added through the feed valve (17) with the gear pump (8) circulating the material at a slow rate through the pressure regulator bypass valve (20). The carbon dioxide feed tank (3) is evacuated through the vent valve (5) and filled with liquid carbon dioxide from the carbon dioxide supply cylinder (1). To make filling the feed tank (3) easier, the carbon dioxide is passed through a refrigeration heat exchanger (2), so that the vapor pressure in the feed tank (3) is lower than the vapor pressure in the supply tank (1). The desired mass of carbon dioxide is pressurized into the circulation loop by heating the carbon dioxide feed tank (3) and valving in the desired amount as read on the balance (6).

The spray pressure is generated by filling the unit with precursor coating composition and carbon dioxide to the required overall density and then heating it to the spray temperature. Prior to spraying, the pressure regulator (19) is bypassed (20) and the loop is at a uniform pressure. To prepare for spraying, the bypass (20) is closed so that the flow goes through the pressure regulator (19), which is adjusted to the flow pressure. During spraying, the spray pressure is kept constant by the gear pump (8) and the pressure regulator (19). The gear pump (8) pumps solution into the spray supply tank (13) from the pump supply tank (7) at a high circulation rate. The pressure regulator (19) discharges excess solution back into the pump supply tank (7). The pump supply tank (7) loses inventory and pressure, but the spray supply tank (13) is kept full and at spray pressure.

The following illustrates apparatus that may be used to obtain the admixed coating composition of precursor coating composition and supercritical fluid and spray it in a continuous mode in the practice of the present invention. The supercritical fluid illustrated is supercritical carbon dioxide fluid.

Table 4 contains a listing of the equipment used in conducting the procedure described for the continuous mode.

TABLE 4

| Item # | Description |
|---|---|
| 1. | Linde bone-dry-grade liquid carbon dioxide in size K cylinder with eductor tube. |
| 2. | Refrigeration heat exchanger. |
| 3. | Hoke cylinder #8HD3000, 3.0-liter volume, made of 304 stainless steel, having double end connectors, 1800-psig pressure rating. |
| 4. | Circle Seal ™ pressure relief valve P168-344-2000 set at 1800 psig. |
| 5. | Vent valve. |
| 6. | Nitrogen gas supply. |
| 7. | Graco double-acting piston pump model #947-963 with 4-ball design and Teflon ™ packings mounted in #5 Hydra-Cat Cylinder Slave Kit #947-943; pump and feed line are refrigeration traced; carbon dioxide pump. |
| 8. | Graco standard double-acting primary piston pump model #207-865 with Teflon ™ packings; coating concentrate pump. |
| 9. | Graco Variable Ratio Hydra-Cat ™ Proportioning Pump unit model #226-936 with 0.9:1 to 4.5:1 ratio range. |
| 10. | Graco President air motor model #207-352. |
| 11. | Utility compressed air at 95 psig supply pressure. |
| 12. | Graco air filter model #106-149. |
| 13. | Graco air pressure regulator model #206-197. |
| 14. | Graco air line oiler model #214-848. |
| 15. | Graco pressure relief valve model #208-317 set at 3000 psig. |
| 16. | Graco pressure relief valve model #208-317 set at 3000 psig. |
| 17. | Graco two-gallon pressure tank model #214-833. |
| 18. | Graco air pressure regulator model #171-937. |
| 19. | Graco pressure relief valve model #103-437 set at 100 psig. |
| 20. | Graco high-pressure fluid heater model #226-816. |
| 21. | Graco high-pressure fluid filter model #218-029. |
| 22. | Graco check valve model #214-037 with Teflon ™ seal. |
| 23. | Graco check valve model #214-037 with Teflon ™ seal. |
| 24. | Graco static mixer model #500-639. |
| 25. | Graco high-pressure fluid heater model #226-816. |
| 26. | Graco high-pressure fluid filter model #218-029. |
| 27. | Kenics static mixer. |
| 28. | Graco fluid pressure regulator model #206-661. |
| 29. | Jerguson high-pressure sight glass series T-30 with window size #6 rated for 2260 psig pressure at 200° F. temperature. |
| 30. | Airless spray gun. |
| 31. | Bonderite ™ 37 polished 24-gauge steel panel, 6-inch by 12-inch size. |
| 32. | Zenith single-stream gear pump, model #HLB-5592-30C, modified by adding a thin Grafoil ™ gasket to improve metal-to-metal seal, with pump drive model #4204157, with 15:1 gear ratio, and pump speed controller model #QM-371726F-15-XP, with speed range of 6 to 120 revolutions per minute. |
| 33. | Circle Seal ™ pressure relief valve P168-344-2000 set at 2000 psig. |
| 34. | Drain from circulation loop. |

The apparatus listed in Table 4 above is assembled as shown in the schematic representation contained in FIG. 4. Rigid connections were made with Dekuron ¼-inch diameter, 0.036-inch thick, seamless, welded, type 304 stainless steel hydraulic tubing ASTM A-269 with 5000-psi pressure rating, using Swagelok TM fittings. The pressure tank (17) is connected to the pump (8) using a Graco ⅜-inch static-free nylon high-pressure hose model #061-221 with 3000-psi pressure rating. All other flexible connections are made using Graco ¼-inch static-free nylon high-pressure hoses model #061-214 with 5000-psi pressure rating.

The precursor coating composition and carbon dioxide are pumped and proportioned by using a Graco Variable Ratio Hydra-Cat TM Proportioning Pump unit (9). It proportions two fluids together at a given volume ratio by using two piston pumps (7 and 8) that are slaved together. The piston rods for each pump are attached to opposite ends of a shaft that pivots up and down on a center fulcrum. The volume ratio is varied by sliding pump (7) along the shaft, which changes the stroke length. The pumps are driven on demand by an air motor (10). Pumping pressure is controlled by the air pressure that drives the air motor. The pumps are double-acting; they pump on upstroke and downstroke. The primary pump (8) is used to pump the coating formulation. It is of standard design, having one inlet and one outlet. It fills through a check valve at the bottom and discharges through a check valve at the top. A third check valve is located in the piston head, which allows liquid to flow from the bottom compartment to the top compartment when the piston is moving downward. This type of pump is designed to be used with low feed pressure, typically below 100 psi. The coating formulation is supplied to the primary pump (8) from a two-gallon pressure tank (17). After being pressurized in the pump to spray pressure, the coating formulation is then heated in an electric heater (20) to reduce its viscosity (to aid mixing with carbon dioxide), filtered in a fluid filter (21) to remove particulates, and fed through a check valve (22) into the mix point with carbon dioxide. The secondary pump (7) on the proportioning pump unit (9) is used to pump the liquid carbon dioxide. A double-acting piston pump (7) with a four-check-valve design is used because of the high vapor pressure of carbon dioxide. The pump has an inlet and an outlet on each side of the piston; no flow occurs through the piston. The proportion of carbon dioxide pumped into the admixed liquid mixture is varied by moving the secondary pump (7) along the moving shaft. Bone-drygrade liquid carbon dioxide is pumped from cylinder (1) through refrigeration heat exchanger (2) to secondary pump (7). For measuring the carbon dioxide uptake rate, the carbon dioxide is pumped from Hoke cylinder (3) through heat exchanger (2) to pump (7). The liquid carbon dioxide is refrigerated in heat exchanger (2) in order to lower the vapor pressure, to prevent cavitation in pump (7). The Hoke cylinder (3) is filled from cylinder (1). Air or gaseous carbon dioxide in the cylinder (3) is vented (5) during filling. The Hoke cylinder (3) is mounted on a 16-kilogram Sartorius electronic scale with 0.1-gram sensitivity so that the amount of carbon dioxide in it can be weighed. After being pressurized to spray pressure in pump (7), the liquid carbon dioxide is fed unheated through check valve (23) to the mix point with the coating formulation. After the coating formulation and carbon dioxide are proportioned together at the mix point, the admixed coating composition is mixed in static mixer (24) and pumped on demand into a circulation loop, which circulates the admixed liquid mixture at spray pressure and temperature to or through the spray gun (30). The admixed liquid mixture is heated in an electric heater (25) to obtain the desired spray temperature and filtered in a fluid filter (26) to remove particulates. Fluid pressure regulator (28) is installed to lower the spray pressure below the pump pressure, if desired, or to help maintain a constant spray pressure. A Jerguson sight glass (29) is used to examine the phase condition of the admixed liquid mixture. Circulation flow in the circulation loop is obtained through the use of gear pump (32).

The pressure tank (17) is filled with the precursor coating concentrate and pressurized with air to 50 psig. The primary pump (8) is primed by opening a drain valve on the bottom of filter (21) until air is purged from the line.

The carbon dioxide secondary pump (7) is positioned along the pivoting shaft to give the desired percentage of maximum piston displacement. The refrigeration flow is adjusted to a temperature of $-10$ C and circulated through the refrigeration heat exchanger (2) and the refrigeration tracing on pump (7). The carbon dioxide feed line and circulation loop are filled with carbon dioxide and vented through valve (34) several times to purge air from the system. Then the valves to the mixing point are closed and the carbon dioxide feed line is filled to prime pump (7).

The air pressure regulator (13) is adjusted to supply the air motor (10) with air at the desired pressure to pressurize the feed lines. The valves to the mix point are opened and the circulation loop filled with material. With the circulation loop return valve closed, to give plug flow around the circulation loop with no backmixing, material is drained from valve (34) until a uniform composition is obtained. Heater (20) is adjusted to give a feed temperature of 37 C. The circulation heater (25) is adjusted to give the spray temperature. The circulation loop return valve is opened and the spray mixture is circulated at a high rate by adjusting the gear pump (32). The carbon dioxide content of the admixed liquid mixture is measured by measuring the carbon dioxide uptake rate from Hoke cylinder (3) and the coating formulation uptake rate from pressure tank (17) while spraying through the spray gun. Then the carbon dioxide feed is switched back to supply cylinder (1).

An alternative method of proportioning the coating formulation and supercritical fluid in a continuous mode uses a mass proportionation apparatus instead of the volumetric proportionation apparatus illustrated above. The variable ratio proportioning pump unit (9) with pumps (7) and (8) shown in FIG. 4 is replaced with an apparatus having the following elements. For pumping the carbon dioxide, the double-acting four-ball piston pump (7) is driven individually on demand by attaching air motor (10) directly to it instead of being driven by the moving beam. Alternatively, the carbon dioxide can be pumped by using an air-driven cryogenic pump such as Haskel model DSF-35, which is a single-acting pump that utilizes a three-way cycling spool that is designed for pumping liquefied gases under pressure without requiring refrigeration to avoid cavitation. The pressurized carbon dioxide is then passed through a pressure regulator, which is used to control the desired spray pressure, and then through a mass-flow meter, such as Micro Motion model D6, which measures the flow rate of carbon dioxide as it is pumped on demand. For pumping the coating formulation, the standard double-acting primary piston pump (8) is replaced with a variable speed gear pump, such as the Zenith gear pump (32) that is used in the circulation loop. The gear pump pumping rate is controlled by a signal processor that receives the instantaneous carbon dioxide flow rate from the mass flow meter and then controls the gear pump revolution rate to pump the coating formulation at the proper flow rate to give the desired proportion of coating formulation and carbon dioxide in the admixed liquid mixture. An accumulator, such as Tobul model 4.7A30-4, may be installed in the circulation loop to increase the loop capacity and to minimize pressure pulsations in the loop when the spray gun is activated.

EXAMPLE 1

A coating formulation that gives a clear acrylic coating was prepared from Rohm & Haas Acryloid AT-400 resin, which contains 75% nonvolatile acrylic polymer dissolved in 25% methyl amyl ketone solvent, and American Cyanamid Cymel™ 323 resin, which is a cross-linking agent that contains 80% nonvolatile melamine polymer dissolved in 20% isobutanol solvent, by mixing the resins with the solvents n-butanol and methyl amyl ketone in the following proportions:

| | |
|---|---|
| Acryloid® AT-400 | 8,694.0 g |
| Cymel™ 323 | 2,718.0 g |
| n-butanol | 626.0 g |
| methyl amyl ketone | 1,336.0 g |
| Total | 13,374.0 g |

The coating formulation contained 65.01% solids fraction and 34.99% solvent fraction.

The coating composition and carbon dioxide were pressurized, mixed, heated, and sprayed in the batch mode. An admixed liquid mixture with a carbon dioxide content of 28% was sprayed at pressure of 1550 psig and temperature of 59 C, which gave a clear single-phase solution. The liquid mixture was sprayed using a Nordson A4B circulating airless hand spray gun model #152-200 with Nordson spray tip #0004/08, which has a 9-mil orifice size and an 8-inch fan width rating. The spray was feathered, as shown in FIG. 3c. The spray deposited a uniform coating thickness with tapered edges, as illustrated in FIG. 5. Other spray tips used to spray this formulation also gave feathered sprays. Feathered sprays are obtained for carbon dioxide content above about 24%.

EXAMPLE 2

A coating formulation that gives a white pigmented acrylic coating was prepared from Acryloid TM AT-400 resin and Cymel TM 323 resin by mixing the resins with Du Pont white titanium dioxide pigment R902; the solvents n-butanol and methyl amyl ketone; and 10% Union Carbide silicone surfactant L5310 dissolved in xylene, in the following proportions:

| pigment R902 | 1,182.3 g |
|---|---|
| Acryloid AT-400 | 1,445.3 g |
| Cymel 323 | 451.6 g |
| n-butanol | 343.2 g |
| methyl amyl ketone | 290.9 g |
| 10% L5310 in xylene | 1.7 g |
| Total | 3,715.0 g |

The coating formulation contained 70.73% solids fraction and 29.27% solvent fraction.

The coating formulation and carbon dioxide were pressurized, mixed, heated, and sprayed in the batch mode. The admixed liquid mixture had a carbon dioxide content of 28.0%, which gave a single-phase solution at the spray temperature of 50 C and pressure of 1600 psig. The admixed liquid mixture was sprayed using a Nordson A4B circulating airless hand spray gun model #152-200 with Nordson spray tip 0004/08, which has a 9-mil orifice size and an 8-inch fan width rating. The spray had a feathered spray pattern and sprayed uniform coatings.

EXAMPLE 3

A coating formulation that gives a clear acrylic coating was prepared from Acryloid AT-400 resin, Rohm & Haas Acryloid AT-954 resin, which, contains 80% nonvolatile acrylic, polymer dissolved in 20% methyl amyl ketone solvent, and Cymel ® 323 resin, by mixing the resins with the solvents n-butanol. ethyl 3-ethoxypropionate (EEP), methyl amyl ketone, and xylene in the following proportions:

| Acryloid AT-400 | 6,520.5 g |
|---|---|
| Acryloid AT-954 | 1,917.8 g |
| Cymel 323 | 2,718.0 g |
| n-butanol | 626.0 g |
| EEP | 889.0 g |
| methyl amyl ketone | 320.0 g |
| xylene | 39.0 g |
| Total | 13,030.3 g |

The coating formulation contained 66.73% solids fraction and 32.97% solvent fraction.

The coating formulation and carbon dioxide were pressurized, mixed, heated, and sprayed in the continuous mode. An admixed liquid mixture with a carbon dioxide content of 30% was sprayed at temperatures of 50 to 60 C and pressures of 1400 to 1600 psig, all of which gave a clear single-phase solution and feathered sprays. Feathered sprays were obtained with all other spray tips used, such as Nordson spray tip #016-011, which has a 9-mil orifice size and a 2-inch fan width rating. This narrow feathered spray is shown in FIGS. 3d and 3e.

EXAMPLE 4

A coating formulation that gives a clear acrylic coating was prepared from Acryloid AT-400 resin, Acryloid AT-954 resin, and Cymel 323 resin, by mixing the resins with the solvents n-butanol, ethyl 3-ethoxypropionate (EEP), methyl amyl ketone, methyl ethyl ketone, and xylene in the following proportions:

| Acryloid AT-954 | 1,197.9 g |
|---|---|
| Acryloid AT-400 | 4,072.9 g |
| Cymel 323 | 1,697.8 g |
| n-butanol | 391.0 g |
| EEP | 555.3 g |
| methyl amyl ketone | 199.9 g |
| methyl ethyl ketone | 2,860.8 g |
| xylene | 24.4 g |
| 50% L5310 in xylene | 32.9 g |
| Total | 11,032.9 g |

The coating composition contained 49.23% solids fraction and 50.77% solvent fraction.

Figure 12D:
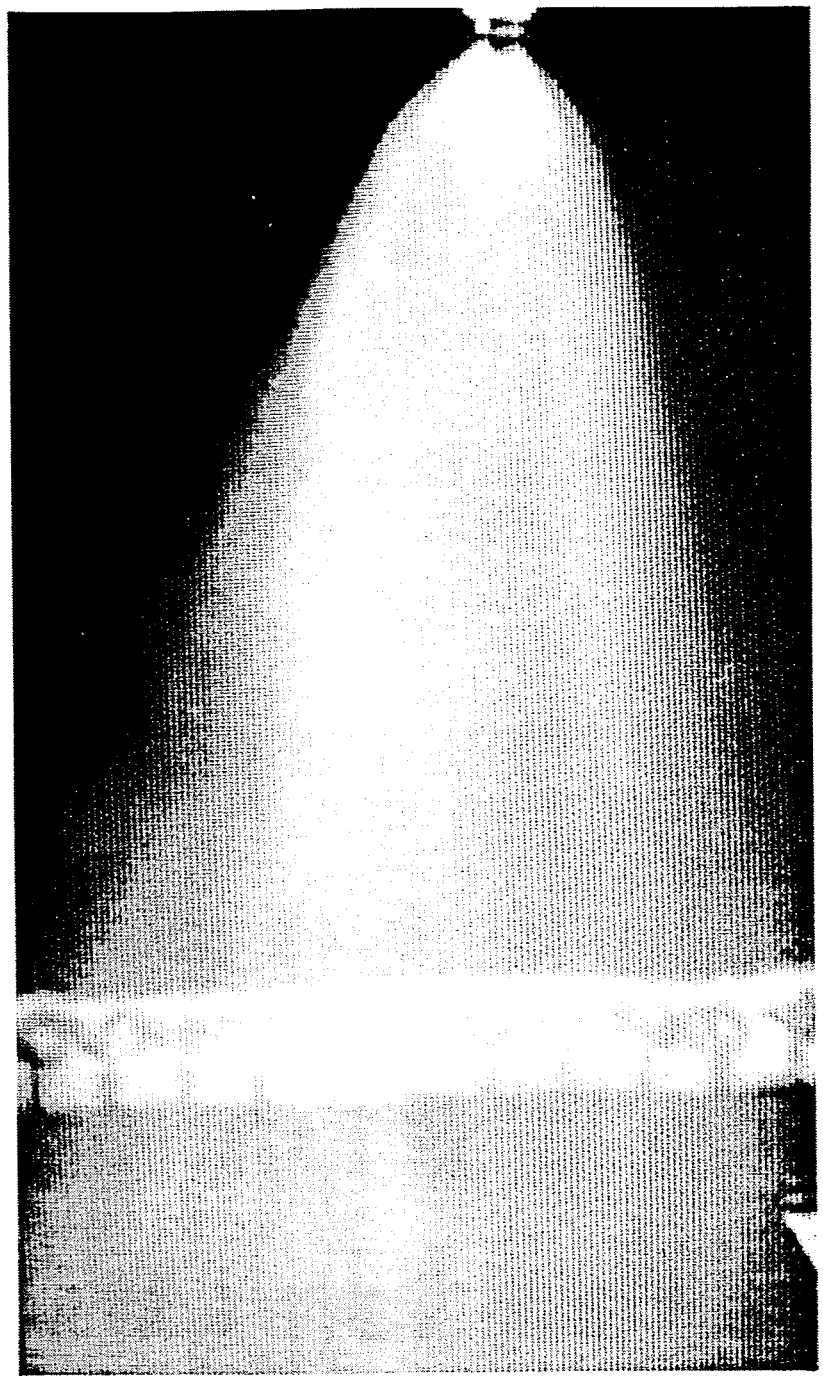
Figure 12B:
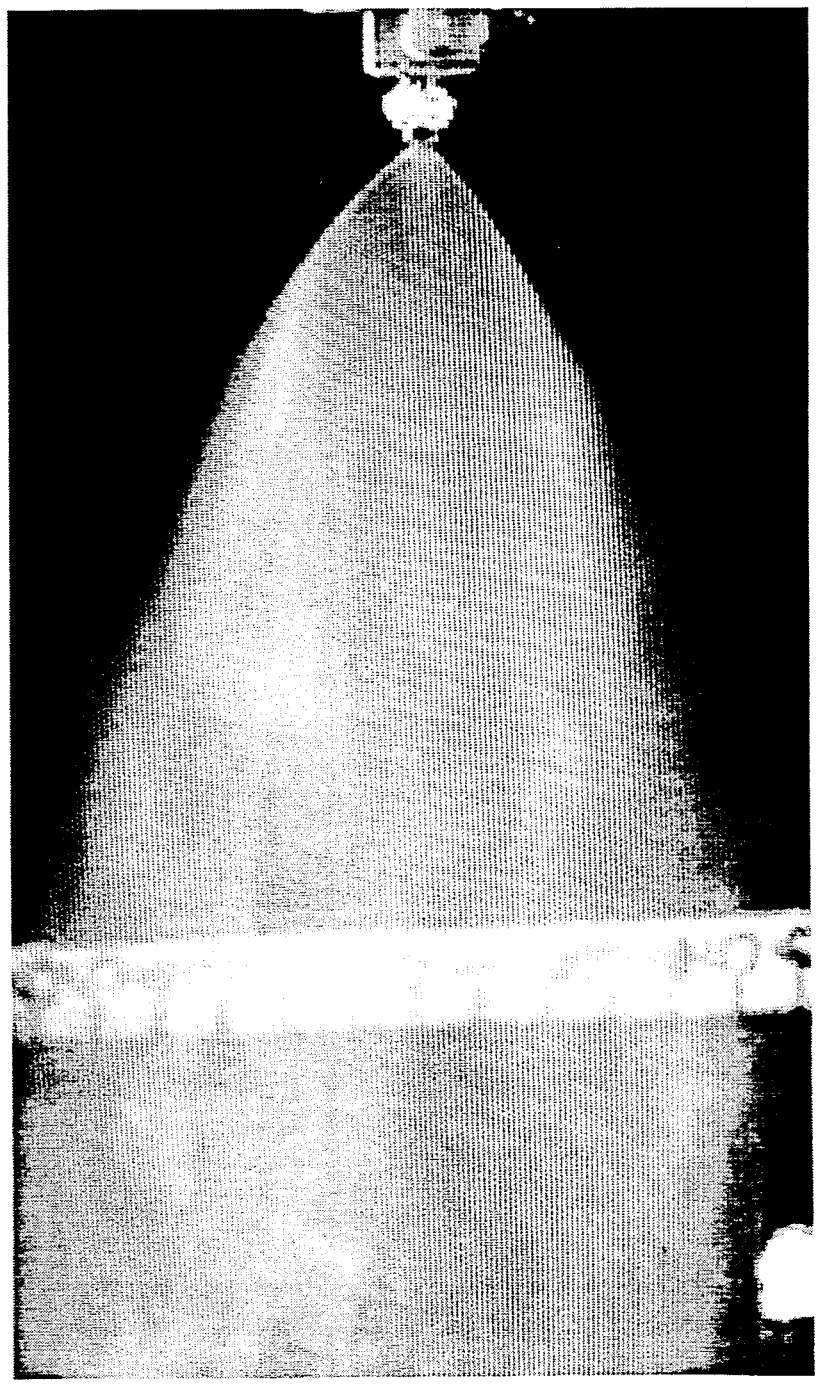
Figure 12C:
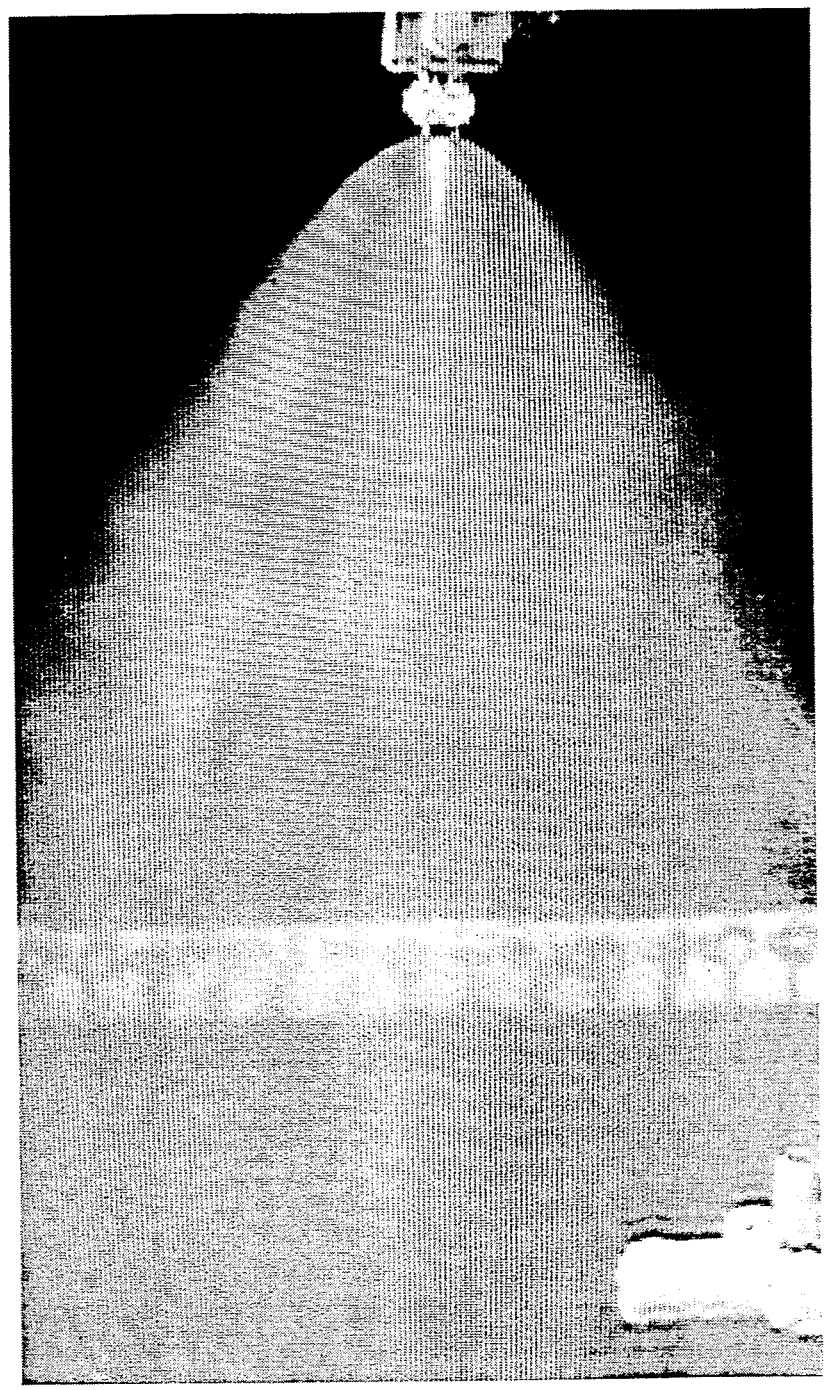
Figure 12D:
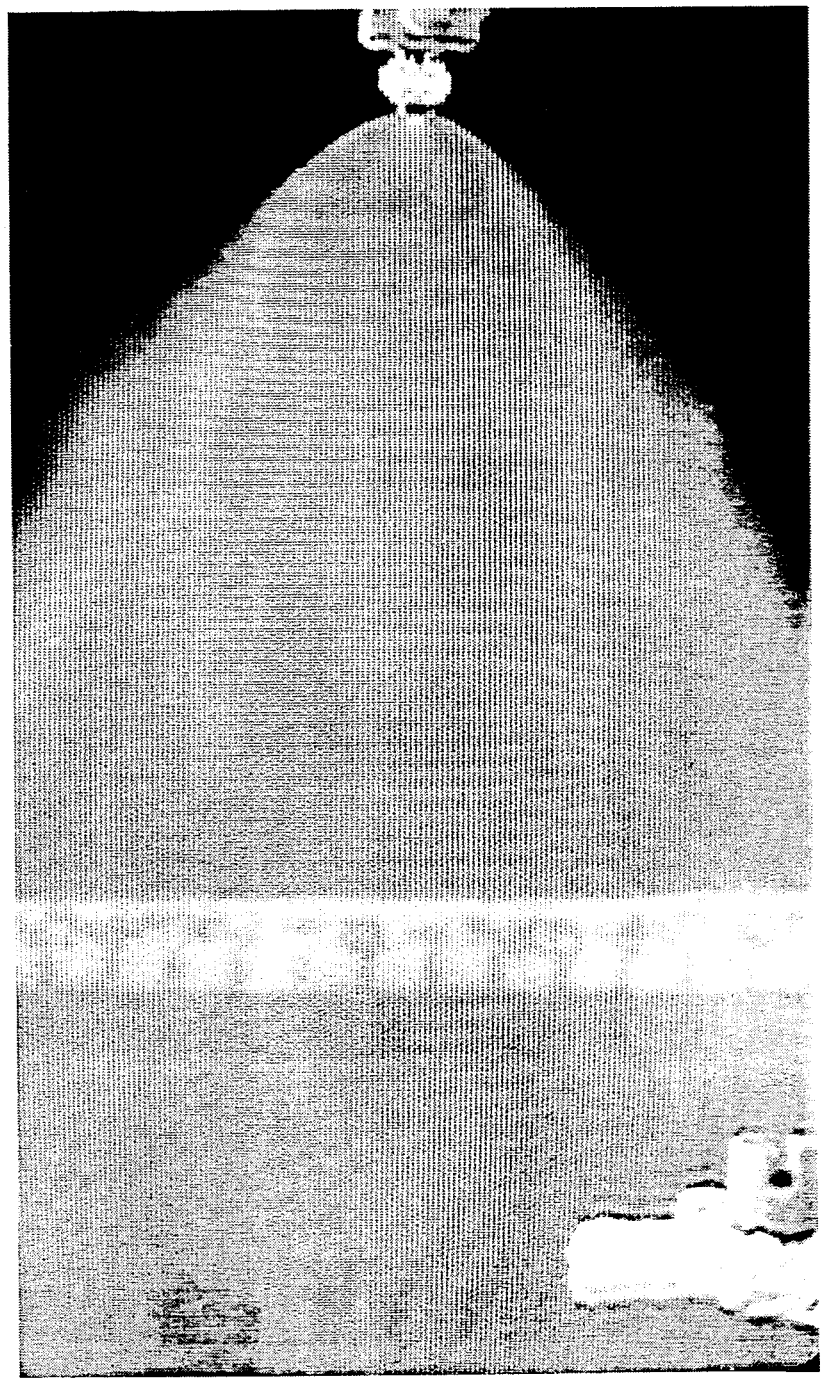

The coating formulation and carbon dioxide were pressurized, mixed, heated, and sprayed in the continuous mode. The admixed liquid mixture was sprayed using a Nordson A7A circulating airless automatic spray gun with tip #016-014, which has a 9-mil orifice size and an 8-inch fan width rating. The liquid mixture was sprayed at a temperature of 60 C and a pressure of 1600 psig at different concentrations of carbon dioxide. Fishtail was present in the spray with no carbon dioxide, as seen in FIG. 4c. With 14% carbon dioxide, fishtail side jets and a liquid film were still evident, as seen in FIG. 12a. With 19.7% carbon dioxide, the size jets had merged into the central spray and the liquid film had recessed into the orifice, as seen in FIG. 12b. With about 22% carbon dioxide, the spray pattern was in the transition region as shown by the spray flaring outward somewhat from the plane of the fan in the center of the spray, as seen in FIG. 12c. With 25% carbon dioxide, the spray pattern had completed the transition to a feathered spray, as seen in FIG. 12d.

EXAMPLE 5

A coating composition that gives a clear polyester coating was prepared from Spencer Kellog Aroplaz 6025-A6-80 resin, which contains 80% nonvolatile polyester polymer dissolved in 20% methyl PROPASOL acetate (MPA) solvent, and Cymel 323 resin, by mixing the resins with the solvents n-butanol and butyl CELLOSOLVE acetate (BCA) in the following proportions:

| Aroplaz 6025-A6-80 | 11,000.0 g |
|---|---|
| Cymel 323 | 3,666.7 g |
| n-butanol | 450.0 g |
| BCA | 2,250.0 g |
| 50% L5310 in xylene | 75.0 g |
| Total | 17,441.7 g |

The coating formulation contained 67.27% solids fraction and 32.73% solvent fraction.

Figure 13:
FIG. 13 is a photoreproduction of a actual atomized liquid spray for a polyester thermosetting coating formulation that contains a feathered spray pattern in accordance with the present invention.

The coating formulation and carbon dioxide were pressurized, mixed, heated, and sprayed in the continuous mode. An admixed liquid mixture with a carbon dioxide content of 25.5% was sprayed at a temperature of 70 C and pressure of 1600 psi, which gave a clear single-phase solution. The admixed liquid mixture was sprayed using a Nordson A7A circulating airless automatic spray gun with a Spraying Systems tip #500011 with a minimum cavity insert and also with Nordson tips #016-011and #016012, all of which have a 9-mil orifice size and width ratings of 8, 2, and 4 inches, respectively. All tips gave a feathered spray fan, as shown in FIG. 13 for spray tip #500011.

EXAMPLE 6

A coating formulation that gives a clear polyester/acrylic coating was prepared from Aroplaz 6025-A6-80 resin, Acryloid AT-400 resin, and Cymel 323 resin, by mixing the resins with the solvents nbutanol, ethyl 3-ethoxypropionate (EEP), and butyl CELLOSOLVE acetate (BCA) in the following proportions:

| Aroplaz 6025-A6-80 | 4,510.8 g |
|---|---|
| Acryloid AT-400 | 2,405.6 g |
| Cymel 323 | 2,255.3 g |
| n-butanol | 276.8 g |
| EEP | 880.0 g |
| BCA | 500.0 g |
| 50% L5310 in xylene | 200.0 g |
| Total | 11,028.5 g |

The coating formulation contained 65.44% solids fraction and 34.56% solvent fraction.

The coating formulation and carbon dioxide were pressurized, mixed, heated, and sprayed in the continuous mode. An admixed liquid mixture with a carbon dioxide content of 25.8% was sprayed at a temperature of 69 C and pressure of 1600 psi, which gave a clear single-phase solution. The admixed liquid mixture was sprayed using a Nordson A7A circulating airless automatic spray gun with a Spraying Systems tip #500011 with a minimum cavity insert, which has a 9-mil orifice size and an 8-inch fan width rating. The spray pattern obtained was feathered.

EXAMPLE 7

A coating formulation that gives a clear acrylic coating that requires no cross-linking or baking was prepared from Rohm & Haas Acryloid B-66 resin by dissolving the resin in methyl amyl ketone solvent. The coating formulation contained 35.00% solids fraction and 65.00% solvent fraction, with the following component composition:

| Acryloid B-66 | 5,600.0 g | 35.00% |
|---|---|---|
| methyl amyl ketone | 10,400.0 g | 65.00% |
| Total | 16,000.0 g | 100.00% |

The admixed liquid mixture was sprayed using a Nordson A7A circulating airless automatic spray gun with a Spraying Systems tip #500011 with a minimum cavity insert and also with Nordson tips #016–011, #016–012, #016–013, and #016–014, all of which have a 9-mil orifice size and the following fan width ratings

| Spray Tip | Fan Width |
|---|---|
| 500011 | 8 inch |
| 016-011 | 2 inch |
| 016-012 | 4 inch |
| 016-013 | 6 inch |
| 016-014 | 8 inch |

The precursor coating composition and carbon dioxide were pressurized, mixed, heated, and sprayed in the continuous mode. An admixed liquid mixture with a carbon dioxide content of 42% was sprayed at a pressure of 1600 psig and temperatures of 60 C and 70 C, which gave a clear single-phase solution. Each spray tip and condition gave a feathered spray pattern.

EXAMPLE 8

A coating formulation that gives a clear cellulose acetate butyrate (CAB) coating that requires no crosslinking or baking was prepared by dissolving Eastman Chemical Cellulose Ester CAB-381-0.1 in solvents methyl amyl ketone and methyl ethyl ketone. The coating formulation contained 30.00% solids fraction and 70.00% solvent fraction, with the following component composition:

| CAB | 4,800.0 g | 30.00% |
|---|---|---|
| methyl ethyl ketone | 4,480.0 g | 28.00% |
| methyl amyl ketone | 6,720.0 g | 42.00% |

The admixed liquid mixture was sprayed using a Nordson A7A circulating airless automatic spray gun with a Spraying Systems tip #500011 with a minimum cavity insert, which has a 9-mil orifice size.

The precursor coating composition and carbon dioxide were pressurized, mixed, heated, and sprayed in the continuous mode. An admixed liquid mixture with a carbon dioxide content of about 48% was sprayed at a pressure of 1600 psig and a temperature of 60 C, which gave a clear single-phase solution. At 48% carbon dioxide, a feathered spray pattern was obtained, as shown in FIG. 10b. With no carbon dioxide, the spray pattern had fishtail, as shown in FIG. 10a. At 28% carbon dioxide, the spray had not transitioned from fishtail to feathered.

EXAMPLE 9

A coating composition that gives a clear acrylic lacquer coating that requires no crosslinking or baking was prepared by using Du Pont Lacquer 380S without the normal thinner but with ethyl 3-ethoxypropionate (EEP) and butyl CELLOSOLVE acetate (BCA) added. The coating formulation contained 27.4% solids fraction and 72.6% solvent fraction, with the following component composition:

| 380S acrylic polymer | 27.4% |
|---|---|
| acetone | 11.8% |
| methyl ethyl ketone | 4.5% |
| isopropyl alcohol | 0.7% |
| toluene | 24.5% |
| butyl acetate | 0.2% |
| methyl propasol acetate | 8.4% |
| aromatic 100 | 4.1% |
| ethyl 3-ethoxypropionate | 9.2% |
| butyl CELLOSOLVE acetate | 9.2% |
| Total | 100.0% |

The admixed liquid mixture was sprayed using a Nordson A7A circulating airless automatic spray gun with spray tip #016-014, which has a 9-mil orifice size and an 8-inch fan width rating.

The precursor coating composition and carbon dioxide were pressurized, mixed, heated, and sprayed in the continuous mode. An admixed liquid mixture with a carbon dioxide content of 38% at a pressure of 1600 psig and temperature of 53 C gave a fishtail spray pattern, as shown in FIG. 11a. At a slightly higher carbon dioxide content of about 40% but at a higher temperature of 59 C, the spray pattern transitioned to a feathered spray, as seen in FIG. 11b.

EXAMPLE 10

A coating formulation that gives a blue metallic acrylic enamel coating was prepared by 1) distilling 5638 grams of Du Pont Centari™ acrylic enamel B8292A medium blue metallic auto refinish paint to remove 1061 grams of fast solvent and 2) adding 1061 grams of slow solvent, namely, 836 grams of ethyl 3-ethoxypropionate (EEP) and 225 grams of butyl CELLOSOLVE acetate (BCA). This paint is normally reduced before usage with thinner (Du Pont 8034S acrylic enamel reducer) in the proportion of adding one gallon of thinner to two gallons of paint, but this reducer was not used. The coating formulation contained 39.4% solids fraction and 60.6% solvent fraction.

The admixed liquid mixture was sprayed using a Nordson A4B circulating airless hand spray gun with spray tip #0003/08, which has a 7-mil orifice size and an 8-inch fan width rating.

The precursor coating composition and carbon dioxide were pressurized, mixed, heated, and sprayed in the continuous mode The spray temperature was 60 C and the pressure was varied from 1500 to 2000 psig. At a carbon dioxide content of 28% the spray had a fishtail spray pattern, but this changed to a feathered spray at a carbon dioxide content of 31%. The feathered spray was unique in that it had an oval shape at lower pressures and a planer fan at higher pressures.

What is claimed is:

1. A method of spraying a liquid mixture to obtain a feathered spray which comprises:
   (a) forming a liquid mixture in a closed system, said liquid mixture comprising:
      (i) a solids fraction containing at least one component capable of forming a coating on a substrate;
      (ii) a solvent fraction which is at least partially miscible with the solids fraction;
      (iii) at least one supercritical fluid in at least an amount which when added to (i) and (ii) is sufficient to form a feathered spray pattern when sprayed; and
   (b) spraying said liquid mixture by passing it under pressure through an orifice to form droplets having an average diameter of 1 micron or greater.

2. The method of claim 1, wherein the solids fraction contains at least one polymeric compound which is selected from the group consisting of thermoplastic resins, thermosetting resins, crosslinkable film forming systems, and mixtures thereof.

3. The method of claim 2, wherein said at least one polymeric compound is selected from the group consisting of enamels, varnishes, lacquers, acrylic resins, vinyl resins, styrenic resins, polyesters, alkyds, polyurethanes, urethanes, epoxies, phenolics, cellulosic esters, amino resins, natural gums, natural resins, and interpolymers and mixtures thereof.

4. The method of claim 1 in which the solids fraction further comprises pigments, pigment extenders, metallic flakes, fillers, drying agents, anti-foaming agents, anti-skinning agents, wetting agents, ultraviolet absorbers, cross-linking agents, and mixtures thereof.

5. The method of claim 1, wherein the solvent fraction contains at least one active solvent selected from the group consisting of ketones, esters, ethers, glycol ethers, glycol ether esters, alcohols, aromatic hydrocarbons, aliphatic hydrocarbons, nitroalkanes, unsaturated hydrocarbons, halocarbons, and mixtures thereof.

6. The method of claim 5, wherein the active solvent includes at least one hydrocarbon solvent.

7. The method of claim 1 in which the solvent fraction contains up to about 30% by weight of water.

8. The method of claim 7 in which solvent fraction contains up to about 20% by weight of water.

9. The method of claim 7 in which the solvent fraction contains a coupling solvent.

10. The method of claim 9, wherein the coupling solvent is selected from the group consisting of ethylene glycol ethers, propylene glycol ethers, lactams, cyclic ureas, and combinations thereof.

11. The method of claim 10, wherein the coupling solvent is selected from the group consisting of butoxy ethanol, propoxy ethanol, hexoxy ethanol, isopropoxy 2-propanol, butoxy 2-propanol, propoxy 2-propanol, tertiary butoxy 2-propanol, ethoxy ethanol, butoxy ethoxy ethanol, propoxy ethoxy ethanol, hoxoxy ethoxy ethanol, methoxy ethanol, methoxy 2-propanol, and ethoxy ethoxy ethanol, n-methyl-2-pyrrolidone, dimethyl ethylene urea, and mixtures thereof.

12. The method of claim 9, wherein the coupling solvent and the active solvent are the same.

13. The method of claim 1 which is sprayed with supercritical carbon dioxide fluid.

14. The method of claim 1 which is sprayed with supercritical nitrous oxide fluid.

15. The method of claim 1 further comprising prior to step (b), heating said liquid mixture to a temperature sufficient to prevent the adverse effect caused by rapid cooling when said liquid mixture is sprayed.

16. The method of claim 1, wherein the supercritical carbon dioxide fluid is present in an amount of at least about 15 weight % based upon the total weight of the liquid mixture.

17. The method of claim 1, wherein the supercritical carbon dioxide fluid is present in amounts ranging from about 20 to about 50 weight %, based upon the total weight of the liquid mixture.

18. The method of claim 1, wherein the orifice size ranges from about 0.004 to about 0.072 inch in diameter.

19. The method of claim 18, wherein the orifice size ranges from about 0.004 to about 0.025 inch in diameter.

20. The method of claim 19, wherein the orifice size ranges from about 0.007 to about 0.015 inch in diameter.

21. The method of claim 1, wherein the spray pressure ranges from about the critical pressure of the supercritical fluid to about 5000 pounds per square inch.

22. The method of claim 21, wherein the spray pressure is below about 3000 pounds per square inch.

23. The method of claim 1, further comprising, prior to step (b), promoting turbulent or agitated flow of said liquid mixture to aid atomization of said liquid spray.

24. The method of claim 1, further comprising utilizing jets of compressed gas to assist formation and atomization of said liquid spray and to modify the shape of said liquid spray.

25. The method of claim 24, wherein said compressed gas is compressed air.

26. The method of claim 25, wherein said compressed air has lowered oxygen content to reduce flammability of said liquid spray.

27. The method of claim 24, wherein said compressed gas is compressed carbon dioxide.

28. The method of claim 24, wherein said compressed gas is selected from the group consisting of compressed nitrogen, helium, argon, xenon, and mixtures thereof.

29. The method of claim 24, wherein the pressure of said compressed gas ranges from about 5 to about 80 pounds per square inch.

30. The method of claim 29, wherein the pressure of said compressed gas ranges from about 5 to about 20 pounds per square inch.

31. The method of claim 24, wherein said compressed gas is heated to supply heat to the liquid spray to prevent the adverse effect caused by rapid cooling when said liquid mixture is sprayed.

32. The method of claim 1 in which the liquid mixture is electrically charged by a high electrical voltage.

33. The method of claim 32, wherein said high electrical voltage ranges from about 30 to about 150 kilovolts.

34. A method of decreasing fishtail in a sprayed liquid coating composition which is capable of forming a coating on a substrate which comprises admixing at least one supercritical fluid with the liquid coating composition in at least an amount sufficient to decrease the fishtail prior to praying it under pressure through an orifice to form droplets having an average diameter of 1 micron or greater.

* * * * *

UNITED STATES PATENT AND TRADEMARK OFFICE
CERTIFICATE OF CORRECTION

PATENT NO. : 5,057,342
DATED : October 15, 1991
INVENTOR(S) : Kenneth L. Hoy; Kenneth A. Nielsen; Hendrik F. Bok It is certified that error appears in the above-identified patent and that said Letters Patent is hereby corrected as shown below:

Column 2, line 17, insert "airless" after the word "unlike".

Column 3, line 65, "Pressure" should read --pressure--.

Column 14, line 51, "retractors" should read --restrictors--.

Column 14, line 59-60, "in'-'seated" should read --inserted--.

Column 15, line 1, "spray This" should read --spray. This--.

Column 15, line 46, "sufficiently. electrically" should read --sufficiently electrically--.

Column 15, line 51, "to" should read --too--.

Column 29, line 24, "mode The" should read --mode. The--.

Column 32, line 10, "praying" should read --spraying--.

Signed and Sealed this

Fifteenth Day of June, 1993

Attest:

MICHAEL K. KIRK

Attesting Officer

Acting Commissioner of Patents and Trademarks